(12) United States Patent
Kashiwagi et al.

(10) Patent No.: US 11,258,996 B2
(45) Date of Patent: Feb. 22, 2022

(54) METHOD OF CONTROLLING DISPLAY SYSTEM AND CONTROL DEVICE

(71) Applicant: SEIKO EPSON CORPORATION, Tokyo (JP)

(72) Inventors: Akihiro Kashiwagi, Azumino (JP); Hiroyuki Ichieda, Matsumoto (JP); Shiki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/084,725

(22) Filed: Oct. 30, 2020

(65) Prior Publication Data

US 2021/0136338 A1 May 6, 2021

(30) Foreign Application Priority Data

Oct. 31, 2019 (JP) .............................. JP2019-198463

(51) Int. Cl.
*G03B 21/14* (2006.01)
*H04N 9/31* (2006.01)
*G03B 21/00* (2006.01)

(52) U.S. Cl.
CPC .......... *H04N 9/3182* (2013.01); *G03B 21/00* (2013.01); *H04N 9/3147* (2013.01); *H04N 9/3191* (2013.01); *H04N 9/3197* (2013.01)

(58) Field of Classification Search
CPC ... H04N 9/3182; H04N 9/3147; H04N 9/3194
See application file for complete search history.

(56) References Cited

U.S. PATENT DOCUMENTS

| 6,340,976 | B1 | 1/2002 | Oguchi |
| 2004/0227908 | A1 | 11/2004 | Wada et al. |
| 2005/0110959 | A1 | 5/2005 | Miyazawa et al. |
| 2007/0103599 | A1 | 5/2007 | Wen-Chin |
| 2011/0309999 | A1 | 12/2011 | Chang et al. |
| 2013/0016118 | A1 | 1/2013 | Mizushiro |
| 2013/0307755 | A1 | 11/2013 | Tomia |

(Continued)

FOREIGN PATENT DOCUMENTS

| JP | 2004-336225 | 11/2004 |
| JP | 2007-300539 | 11/2007 |
| JP | 2008-151838 | 7/2008 |

(Continued)

*Primary Examiner* — Ryan D Howard
(74) *Attorney, Agent, or Firm* — Dority & Manning, P.A.

(57) ABSTRACT

A method of controlling a display system including the steps of projecting, by one of the first projectors, a first image in one area, projecting, by one of the second projectors, a second image in the one area, estimating, by the control device, brightness of the plurality of first images and brightness of the plurality of second images, identifying, by the control device, a first dark image as the darkest image and a first adjustment target image, and identifying a second dark image as the darkest image and a second adjustment target image, and controlling, by the control device, a projector to thereby approximate the brightness of the first adjustment target image to the brightness of the first dark image, and controlling a projector to thereby approximate the brightness of the second adjustment target image to the brightness of the second dark image.

17 Claims, 11 Drawing Sheets

(56) References Cited

U.S. PATENT DOCUMENTS

2015/0138222 A1* 5/2015 Imaizumi ............... G03B 21/00
                                                          345/589
2019/0028685 A1   1/2019 Kaji

FOREIGN PATENT DOCUMENTS

| | | |
|---|---|---|
| JP | 2012-517621 | 8/2012 |
| JP | 2013-020056 | 1/2013 |
| JP | 2013-085182 | 5/2013 |
| JP | 2017-223718 | 12/2017 |
| WO | WO2005/036874 | 4/2005 |

* cited by examiner

FIG. 2

| COMPOSITE IMAGE | PARTIAL IMAGE (DIVISIONAL IMAGE) | DISPLAY AREA | PROJECTOR 1 | PROJECTOR GROUP | PROJECTOR BELONGING TO |
|---|---|---|---|---|---|
| FIRST COMPOSITE IMAGE E1 | FIRST PROJECTION IMAGE F1 | FIRST AREA 31 | FIRST SPECIFIC PROJECTOR 1A | FIRST PROJECTOR GROUP 101 | FIRST PROJECTOR |
| | THIRD PROJECTION IMAGE F3 | SECOND AREA 32 | THIRD SPECIFIC PROJECTOR 1C | | |
| SECOND COMPOSITE IMAGE E2 | SECOND PROJECTION IMAGE F2 | FIRST AREA 31 | SECOND SPECIFIC PROJECTOR 1B | SECOND PROJECTOR GROUP 102 | SECOND PROJECTOR |
| | FOURTH PROJECTION IMAGE F4 | SECOND AREA 32 | FOURTH SPECIFIC PROJECTOR 1D | | |

FIG. 3

| DISPLAY AREA | COMPOSITE IMAGE | PARTIAL IMAGE (DIVISIONAL IMAGE) |
|---|---|---|
| FIRST AREA 31 | FIRST COMPOSITE IMAGE E1 | FIRST PROJECTION IMAGE F1 |
| | | THIRD PROJECTION IMAGE F3 |
| SECOND AREA 32 | SECOND COMPOSITE IMAGE E2 | SECOND PROJECTION IMAGE F2 |
| | | FOURTH PROJECTION IMAGE F4 |

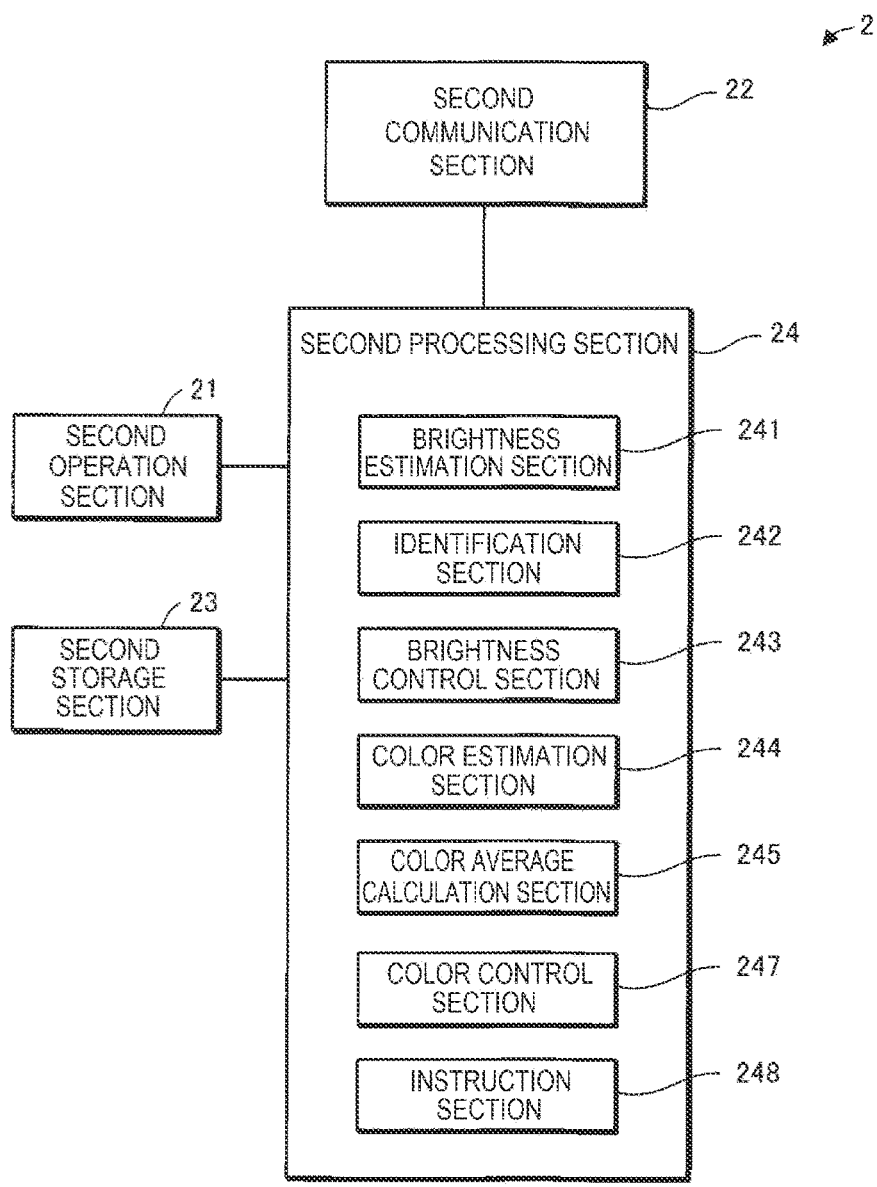

| IMAGE | WHITE IMAGE | PROJECTION IMAGE |
|---|---|---|
| FIRST IMAGE | FIRST WHITE IMAGE F1W | FIRST PROJECTION IMAGE F1 PROJECTED IN FIRST AREA 31 BASED ON WHITE IMAGE SIGNAL |
| FIRST IMAGE | THIRD WHITE IMAGE F3W | THIRD PROJECTION IMAGE F3 PROJECTED IN SECOND AREA 32 BASED ON WHITE IMAGE SIGNAL |
| SECOND IMAGE | SECOND WHITE IMAGE F2W | SECOND PROJECTION IMAGE F2 PROJECTED IN FIRST AREA 31 BASED ON WHITE IMAGE SIGNAL |
| SECOND IMAGE | FOURTH WHITE IMAGE F4W | FOURTH PROJECTION IMAGE F4 PROJECTED IN SECOND AREA 32 BASED ON WHITE IMAGE SIGNAL |

FIG. 8

| IMAGE | BRIGHTNESS AND SO ON |
|---|---|
| FIRST DARK IMAGE | THE DARKEST OF FIRST WHITE IMAGE F1W AND THIRD WHITE IMAGE F3W |
| FIRST ADJUSTMENT TARGET IMAGE | DIFFERENT FROM FIRST DARK IMAGE OUT OF FIRST WHITE IMAGE F1W AND THIRD WHITE IMAGE F3W |
| SECOND DARK IMAGE | THE DARKEST OF SECOND WHITE IMAGE F2W AND FOURTH WHITE IMAGE F4W |
| SECOND ADJUSTMENT TARGET IMAGE | DIFFERENT FROM SECOND DARK IMAGE OUT OF SECOND WHITE IMAGE F2W AND FOURTH WHITE IMAGE F4W |

FIG. 9

| IMAGE | RED IMAGE | PROJECTION IMAGE |
|---|---|---|
| THIRD IMAGE | FIRST RED IMAGE F11 | FIRST PROJECTION IMAGE F1 PROJECTED IN FIRST AREA 31 BASED ON RED IMAGE SIGNAL |
| THIRD IMAGE | SECOND RED IMAGE F22 | SECOND PROJECTION IMAGE F2 PROJECTED IN FIRST AREA 31 BASED ON RED IMAGE SIGNAL |
| THIRD IMAGE | THIRD RED IMAGE F33 | THIRD PROJECTION IMAGE F3 PROJECTED IN SECOND AREA 32 BASED ON RED IMAGE SIGNAL |
| THIRD IMAGE | FOURTH RED IMAGE F44 | FOURTH PROJECTION IMAGE F4 PROJECTED IN SECOND AREA 32 BASED ON RED IMAGE SIGNAL |

FIG. 10

| IMAGE | COLOR AND SO ON |
|---|---|
| THIRD ADJUSTMENT TARGET IMAGE | SHOWING VALUE OF COLOR DIFFERENT FROM FIRST AVERAGE VALUE OUT OF FIRST RED IMAGE F11 AND THIRD RED IMAGE F33 |
| FOURTH ADJUSTMENT TARGET IMAGE | SHOWING VALUE OF COLOR DIFFERENT FROM SECOND AVERAGE VALUE OUT OF SECOND RED IMAGE F22 AND FOURTH RED IMAGE F44 |

FIG. 11

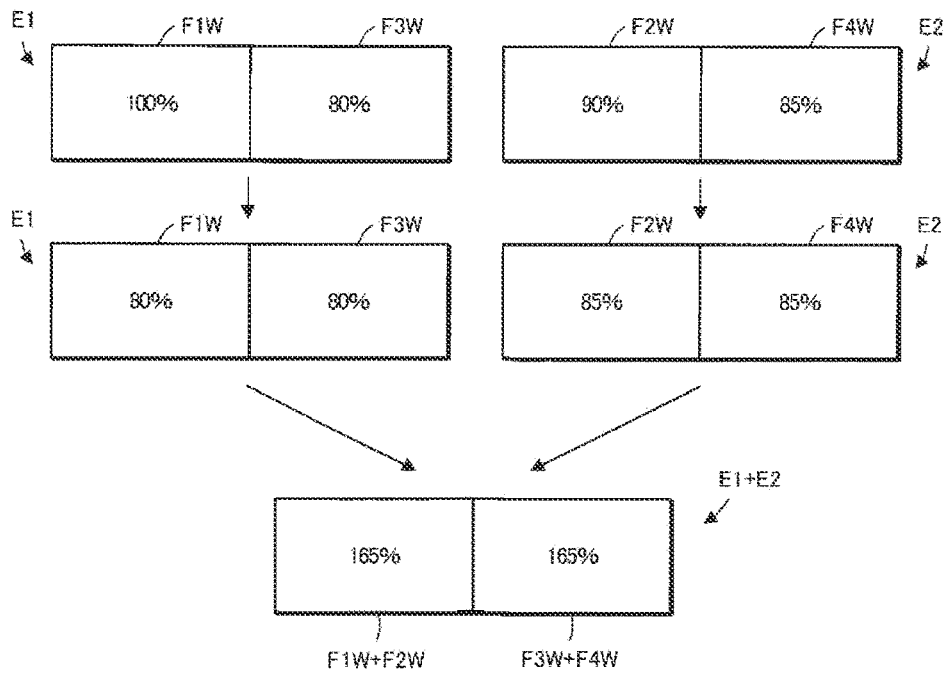

METHOD OF CONTROLLING DISPLAY SYSTEM AND CONTROL DEVICE

The present application is based on, and claims priority from JP Application Serial Number 2019-198463, filed Oct. 31, 2019, the disclosure of which is hereby incorporated by reference herein in its entirety.

BACKGROUND

1. Technical Field

The present disclosure relates to a method of controlling a display system, and a control device.

2. Related Art

In JP-A-2017-223718 (Document 1), there is described a projection system having projectors 100A through 100D.

This projection system superimposes an image projected by the projector 100A on an image projected by the projector 100B in a first projection area to thereby display a first stacked image. Further, this projection system superimposes an image projected by the projector 100C on an image projected by the projector 100D in a second projection area to thereby display a second stacked image. Further, by arranging the first stacked image and the second stacked image side by side, there is displayed a tiling image.

In the technology described in Document 1, when the images are different in brightness from each other in the situation in which the projectors 100A through 100D project the images based on a common image signal, there occurs unevenness in brightness in the tiling image.

As a method of reducing the unevenness, it is possible to make the brightness of the image projected by each of the projectors 100A through 100D coincide with the brightness of the darkest image of the images projected by the projectors 100A through 100D.

However, in this case, the tiling image which has been adjusted becomes dark.

SUMMARY

A method of controlling a display system according to an aspect of the present disclosure is a method of controlling a display system including a plurality of first projectors, a plurality of second projectors, and a control device, the method including the steps of projecting, by one of the first projectors, an image in one display area corresponding to the one of the first projectors out of a plurality of display areas, and projecting, by one of the second projectors corresponding to the one display area, an image in the one display area to thereby display one of images corresponding one-to-one to the plurality of first projectors and one of images corresponding one-to-one to the plurality of second projectors in the one display area, making, by the control device, each of the first projectors project a first image to estimate brightness of each of the first images, and making each of the second projectors project a second image to estimate brightness of each of the second images, identifying, by the control device, a first dark image as a darkest image and a first adjustment target image different from the first dark image out of the plurality of first images based on a result of the estimation of the brightness of each of the first images, and identifying a second dark image as a darkest image and a second adjustment target image different from the second dark image out of the plurality of second images based on a result of the estimation of the brightness of each of the second images, and controlling, by the control device, a projector configured to project the first adjustment target image to thereby approximate the brightness of the first adjustment target image to the brightness of the first dark image, and controlling a projector configured to project the second adjustment target image to thereby approximate the brightness of the second adjustment target image to the brightness of the second dark image.

A method of controlling a display system according to another aspect of the present disclosure is a method of controlling a display system including a first specific projector, a second specific projector, a third specific projector, and a fourth specific projector, the method including the steps of projecting, by the first specific projector, a first projection image with first brightness in a first area based on a first image signal, projecting, by the second specific projector, a second projection image with second brightness in the first area based on the first image signal, projecting, by the third specific projector, a third projection image with third brightness in a second area based on the first image signal, projecting, by the fourth specific projector, a fourth projection image with fourth brightness in the second area based on the first image signal, displaying a first composite image with the first projection image displayed in the first area and the third projection image displayed in the second area, displaying a second composite image with the second projection image displayed in the first area and the fourth projection image displayed in the second area, projecting, by the first specific projector, the first projection image with the third brightness when the third brightness is darker than the first brightness, controlling, by the first specific projector, the third specific projector to thereby project the third projection image with the first brightness when the first brightness is darker than the third brightness, controlling, by the first specific projector, the second specific projector to thereby project the second projection image with the fourth brightness when the fourth brightness is darker than the second brightness, controlling, by the first specific projector, the fourth specific projector to thereby project the fourth projection image with the second brightness when the second brightness is darker than the fourth brightness, and projecting, by the first specific projector, the second specific projector, the third specific projector, and the fourth specific projector, a superimposed image which is obtained by superimposing the first composite image and the second composite image, and is brighter than the first brightness, the second brightness, the third brightness, and the fourth brightness.

A control device according to another aspect of the present disclosure is a control device configured to control a display system which includes a plurality of first projectors and a plurality of second projectors, and in which one of the first projectors projects an image in one display area corresponding to the one of the first projectors out of a plurality of display areas, and one of the second projectors corresponding to the one display area projects an image in the one display area to thereby display one of images corresponding one-to-one to the plurality of first projectors and one of images corresponding one-to-one to the plurality of second projectors in the one display area, the control device including an estimation section configured to make each of the first projectors project a first image to estimate brightness of each of the first images, and make each of the second projectors project a second image to estimate brightness of each of the second images, an identification section configured to identify a first dark image as a darkest image and a first adjustment target image different from the first dark image out of the plurality of first images based on a result of the estimation of the brightness of each of the first images, and identify a second dark image as a darkest image and a second adjustment target image different from the second dark image out of the plurality of second images based on a result of the estimation of the brightness of each of the second images, and a brightness control section configured to control a projector configured to project the first adjustment target image to thereby approximate the brightness of the first adjustment target image to the brightness of the first dark image, and control a projector configured to project the second adjustment target image to thereby approximate the brightness of the second adjustment target image to the brightness of the second dark image.

BRIEF DESCRIPTION OF THE DRAWINGS

FIG. 2 is a diagram showing an example of a relationship between projectors, projection images, and display areas in the display system.

FIG. 3 is a diagram showing an example of stack projection of a composite image as a result of tiling projection.

FIG. 6 is a diagram showing an example of a control device.

FIG. 7 is a diagram showing an example of a first image and a second image.

FIG. 8 is a diagram showing an example of a first dark image, a first adjustment target image, a second dark image, and a second adjustment target image.

FIG. 9 is a diagram showing an example of a third image.

FIG. 10 is a diagram showing an example of a third adjustment target image and a fourth adjustment target image.

FIG. 11 is a diagram for explaining an outline of the brightness control.

DESCRIPTION OF EXEMPLARY EMBODIMENTS

A: First Embodiment

A1: Outline of Display System 1000

Figure 1:
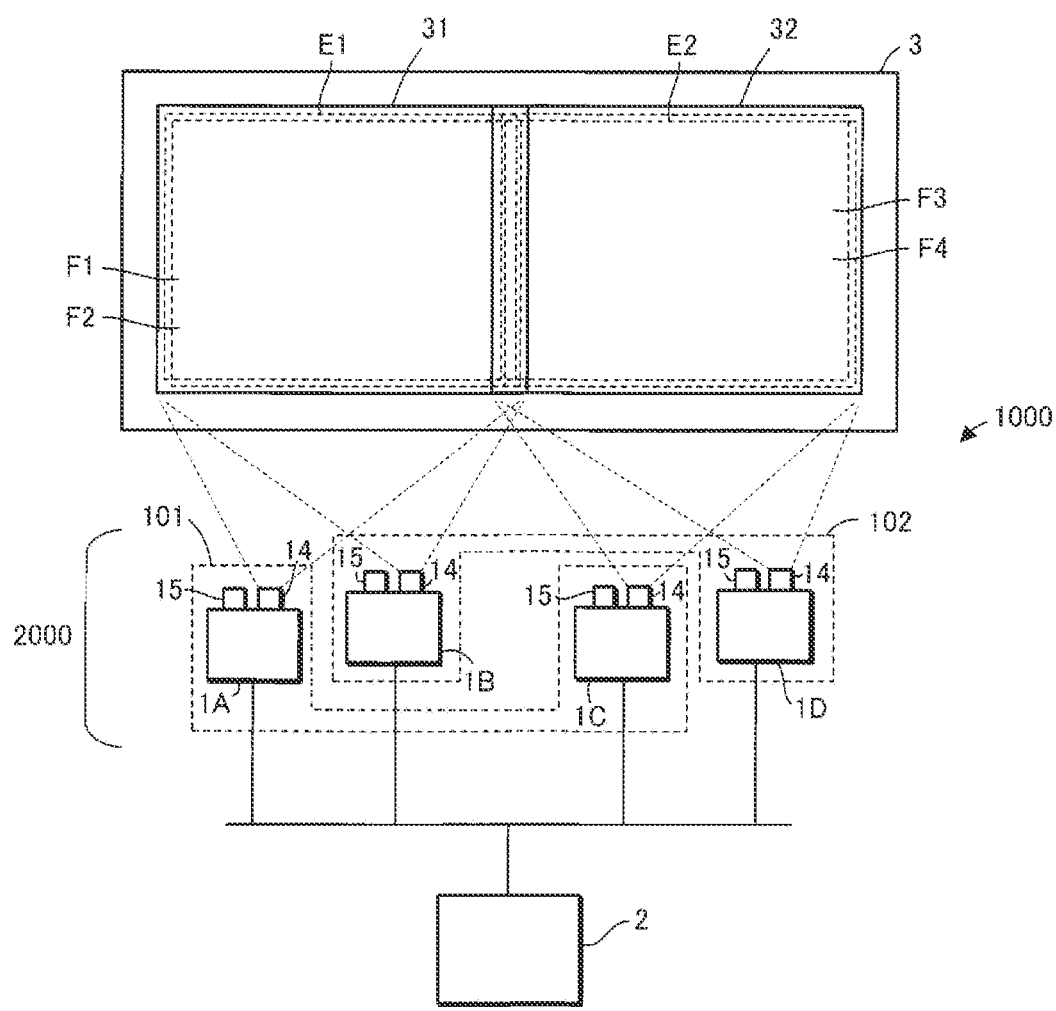
FIG. 1 is a diagram showing an example of a display system.
Figure 4:
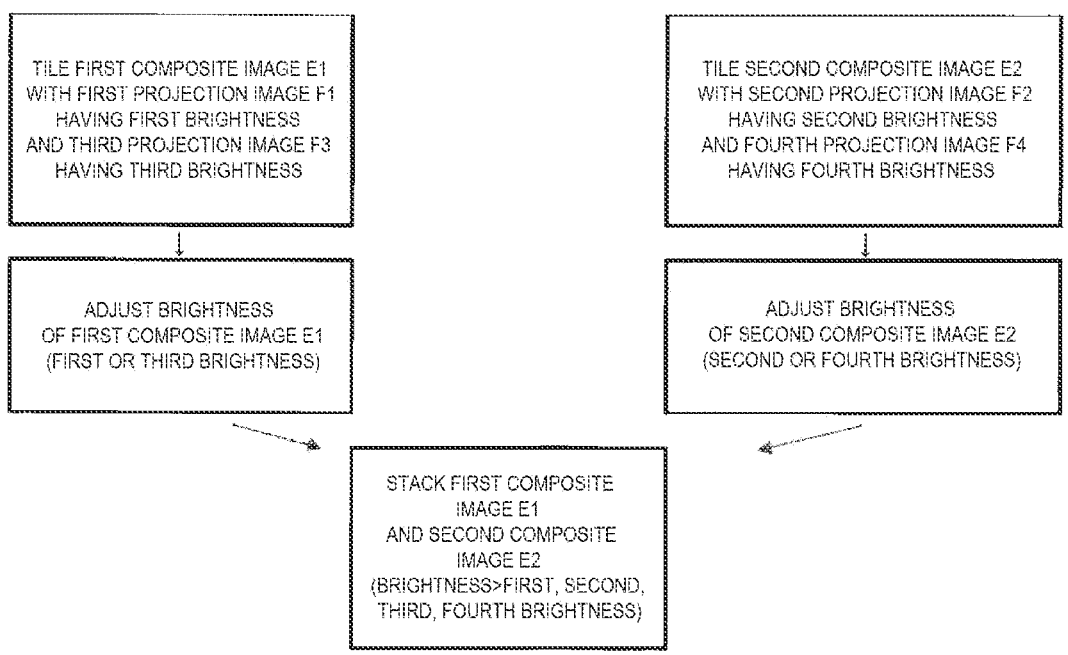
FIG. 4 is a diagram schematically showing an example of the stack projection on which brightness adjustment control in the composite image as a result of the tiling projection has been performed.

FIG. 1 is a diagram showing an example of a display system 1000. The display system 1000 includes a projection system 2000 and a control device 2. The projection system 2000 projects a first composite image E1 and a second composite image E2 on a display surface 3. The first composite image E1 and the second composite image E2 are an example of a plurality of composite images. The plurality of composite images is not limited to the two composite images. The plurality of composite images can be three or more composite images. The display surface 3 is, for example, a screen. The display surface 3 is not limited to the screen, but can also be, for example, a whiteboard, a wall, a ceiling, a floor, or a door. FIG. 2 is a diagram showing an example of a relationship between projectors, projection images, and display areas in the display system 1000. FIG. 3 is a diagram showing stack projection of a composite image as a result of tiling projection. FIG. 4 is a diagram schematically showing control of the tiling projection and the stack projection. FIG. 4 shows that the stack projection is performed on the first composite image E1 on which the tiling projection has been performed and on which the brightness adjustment has been performed, and the second composite image E2 on which the tiling projection has been performed and on which the brightness adjustment has been performed.

The projection system 2000 includes a first specific projector 1A through a fourth specific projector 1D. The first specific projector 1A through the fourth specific projector 1D are an example of the plurality of projectors. The plurality of projectors is not limited to the four projectors. The plurality of projectors can also be five or more projectors. The first specific projector 1A through the fourth specific projector 1D are divided into a first projector group 101 and a second projector group 102.

The first projector group 101 projects the first composite image E1 on the display surface 3. The second projector group 102 projects the second composite image E2 on the display surface 3. In FIG. 1, the first composite image E1 and the second composite image E2 are shifted from each other for the sake of convenience in order to make it easy to distinguish the first composite image E1 and the second composite image E2 from each other. In reality, the first composite image E1 and the second composite image E2 are superimposed on each other in a common area in the display surface 3.

The first projector group 101 and the second projector group 102 are an example of the plurality of projector groups. The plurality of projector groups is not limited to the two projector groups, but can also be three or more projector groups. The plurality of projector groups corresponds one-to-one to the plurality of composite images. The first projector group 101 corresponds to the first composite image E1. The second projector group 102 corresponds to the second composite image E2.

The first projector group 101 and the second projector group 102 each include a plurality of projectors. The first projector group 101 includes the first specific projector 1A and the third specific projector 1C. The first specific projector 1A and the third specific projector 1C are an example of a plurality of first projectors. The first specific projector 1A is an example of one of the first projectors. The second projector group 102 includes the second specific projector 1B and the fourth specific projector 1D. The second specific projector 1B and the fourth specific projector 1D are an example of a plurality of second projectors. The second specific projector 1B is an example of one of the second projectors. The plurality of first projectors and the plurality of second projectors can each include three or more projectors.

The first specific projector 1A through the fourth specific projector 1D are the same in configuration as each other. It should be noted that the first specific projector 1A through the fourth specific projector 1D are not required to be the same in configuration as each other. Hereinafter, when there is no need to distinguish the first specific projector 1A through the fourth specific projector 1D from each other, these projectors are referred to as "projectors 1."

The first specific projector 1A projects a first projection image F1 in a first area 31 of the display surface 3. The second specific projector 1B projects a second projection image F2 in the first area 31. The third specific projector 1C projects a third projection image F3 in a second area 32 of the display surface. The fourth specific projector 1D projects a fourth projection image F4 in the second area 32. The content of the first projection image F1 is the same as the content of the second projection image F2. In other words, the first projection image F1 is the same as the second projection image F2. The content of the third projection image F3 is the same as the content of the fourth projection image F4. In other words, the third projection image F3 is the same as the fourth projection image F4. The first area 31 and the second area 32 are an example of a plurality of display areas. The first display area 31 is an example of one of the display areas. The plurality of display areas is not limited to the two display areas. For example, the plurality of display areas can be three or more display areas.

The first specific projector 1A corresponds to the first area 31. The second specific projector 1B corresponds to the first area 31. The third specific projector 1C corresponds to the second area 32. The fourth specific projector 1D corresponds to the second area 32.

Apart of the first area 31 overlaps apart of the second area 32. Therefore, a part of the first projection image F1 overlaps a part of the third projection image F3. Apart of the second projection image F2 overlaps a part of the fourth projection image F4. A part of the third projection image F3 overlaps a part of the first projection image F1. A part of the fourth projection image F4 overlaps a part of the second projection image F2. On the part overlapping the third projection image F3 in the first projection image F1, there is performed a so-called edge blending process. The edge blending process means a process of performing a dimming process in an overlapping area overlapping another projection image in the projection image to thereby reduce a difference in brightness between the overlapping area and a non-overlapping area.

The edge blending process is also performed on a part overlapping the fourth projection image F4 in the second projection image F2, a part overlapping the first projection image F1 in the third projection image F3, and a part overlapping the second projection image F2 in the fourth projection image F4.

It should be noted that a part of the first area 31 is not required to overlap a part of the second area 32. In this case, the edge blending process is not performed in the first projection image F1 through the fourth projection image F4.

The first composite image E1 is formed of the first projection image F1 and the third projection image F3. In the first composite image E1, the first projection image F1 and the third projection image F3 are located in respective areas different from each other. The first projection image F1 and the third projection image F3 are each a part of the first composite image E1. The first projection image F1 and the third projection image F3 can each be referred to as a partial image of the first composite image E1, or a divisional image of the first composite image E1.

The second composite image E2 is formed of the second projection image F2 and the fourth projection image F4. In the second composite image E2, the second projection image F2 and the fourth projection image F4 are located in respective areas different from each other. The second projection image F2 and the fourth projection image F4 are each a part of the second composite image E2. The second projection image F2 and the fourth projection image F4 can each be referred to as a partial image of the second composite image E2, or a divisional image of the second composite image E2.

As described above, the first composite image E1 and the second composite image E2 are located in the common area in the display surface 3. The first composite image E1 is superimposed on the second composite image E2. The first projection image F1 is superimposed on the second projection image F2. It should be noted that it can also be referred to that the second projection image F2 is superimposed on the first projection image F1. The third projection image F3 is superimposed on the fourth projection image F4. It should be noted that it can also be referred to that the fourth projection image F4 is superimposed on the third projection image F3.

The control device 2 is, for example, a PC (Personal Computer). The control device 2 is not limited to the PC, but can also be, for example, a tablet terminal or a smartphone. The control device 2 can also be a device to be installed in any one of the first specific projector 1A through the fourth specific projector 1D. In this case, the projector equipped with the control device 2 out of the first specific projector 1A through the fourth specific projector 1D can be referred to as a "master projector."

The control device 2 communicates with each of the first specific projector 1A through the fourth specific projector 1D via, for example, a wired LAN (Local Are Network). The communication format between the control device 2 and the first specific projector 1A through the fourth specific projector 1D is not limited to the wired LAN, but can also be, for example, a wireless LAN or Bluetooth. Bluetooth is a registered trademark. The control device 2 controls the projection system 2000.

A2: One Example of Projector 1

Figure 5:
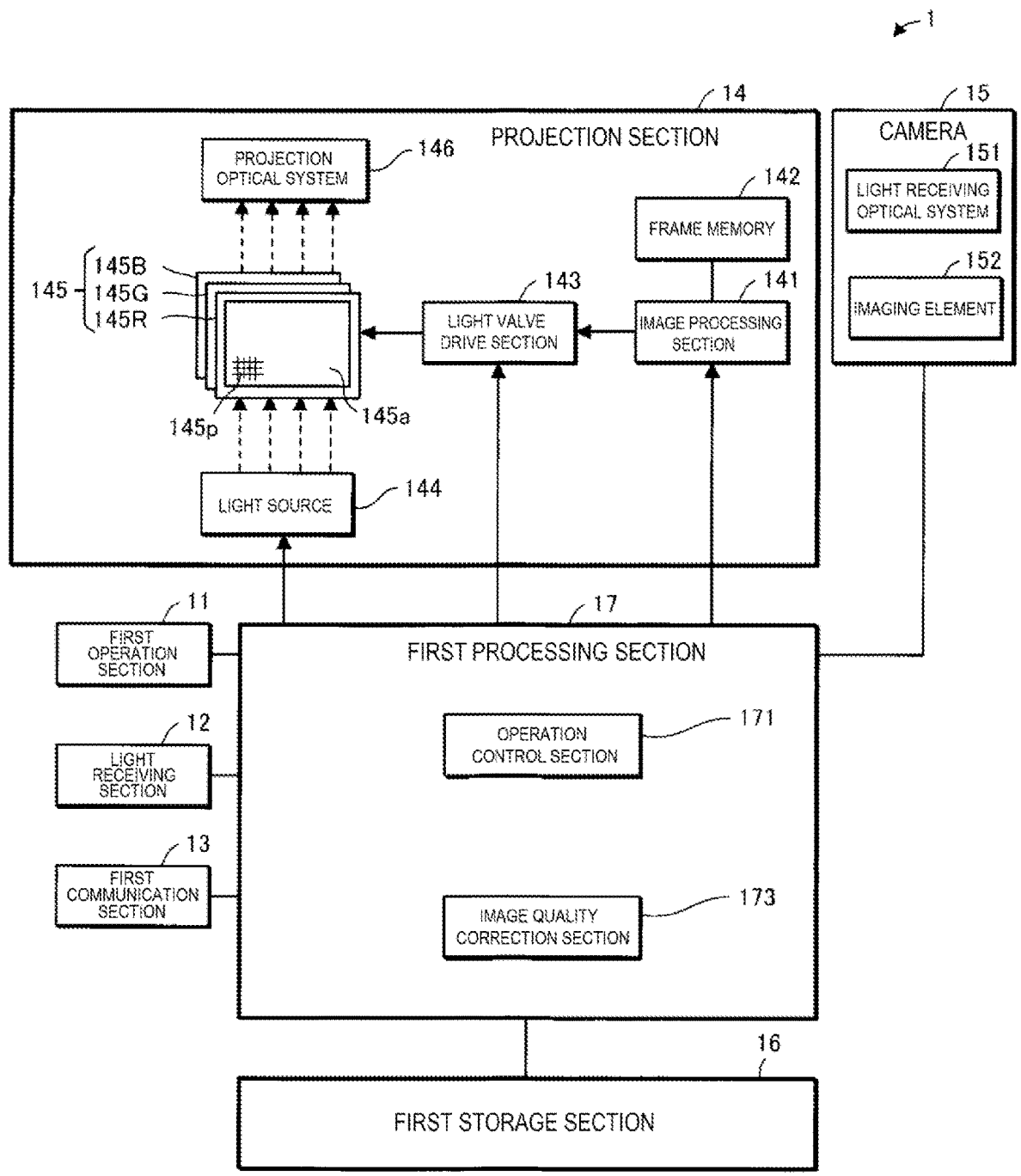
FIG. 5 is a diagram showing an example of a projector.

FIG. 5 is a diagram showing an example of the projector 1. The projector 1 includes a first operation section 11, a light receiving section 12, a first communication section 13, a projection section 14, a camera 15, a first storage section 16, and a first processing section 17.

The first operation section 11 corresponds to, for example, a variety of operating buttons, operating keys, or a touch panel. The first operation section 11 is provided to a housing of the projector 1. The first operation section 11 receives an input operation by the user.

The light receiving section 12 receives an infrared signal based on the input operation to a remote controller not shown from the remote controller. The remote controller is provided with a variety of operating buttons, operating keys, or a touch panel for receiving the input operation.

The first communication section 13 communicates with the control device 2. The communication format between the first communication section 13 and the control device 2 is the wired LAN as described above. It should be noted that the communication format between the first communication section 13 and the control device 2 is not limited to the wired LAN.

The projection section 14 projects an image on the display surface 3 to thereby display the image on the display surface 3. The projection section 14 includes an image processing section 141, a frame memory 142, a light valve drive section 143, a light source 144, a red-color liquid crystal light valve 145R, a green-color liquid crystal light valve 145G, a blue-color liquid crystal light valve 145B, and a projection optical system 146. Hereinafter, when there is no need to distinguish the red-color liquid crystal light valve 145R, the green-color liquid crystal light valve 145G, and the blue-color liquid crystal light valve 145B from each other, these are referred to as "liquid crystal light valves 145."

The image processing section 141 is formed of a circuit such as a single image processor or a plurality of image processors. The image processing section 141 receives an image signal from, for example, the first processing section 17. It is also possible for the image processing section 141 to receive the image signal from an image supply device. The image supply device is, for example, the control device 2. The image supply device can also be a device different from the control device 2. The device different from the control device 2 is, for example, a PC. The image supply device is not limited to the PC, but can also be, for example, a tablet terminal, a smartphone, a video reproduction device, a DVD (Digital Versatile Disc) player, a Blu-ray disc player, a hard disk recorder, a television tuner device, or a video game device.

The image processing section 141 develops the image signal on the frame memory 142. The frame memory 142 is formed of a storage device such as a RAM (Random Access Memory). The image processing section 141 performs image processing on the image signal having been developed on the frame memory 142 to thereby generate a drive signal.

The image processing executed by the image processing section 141 includes, for example, a geometric correction process for correcting a keystone distortion of the image to be projected by the projection section 14. It is also possible for the image processing section 141 to execute other image processing such as a resolution conversion process in addition to the geometric correction process. In the resolution conversion process, the image processing section 141 converts the resolution of the image represented by the image signal into, for example, the resolution of the liquid crystal light valves 145. The other image processing is not limited to the resolution conversion process. The other image processing can be, for example, an OSD (On-Screen Display) process of superimposing an OSD image on the image represented by the image signal provided from the image supply device. The other image processing can also be so-called gamma processing of executing the gamma correction.

The light valve drive section 143 is formed of a circuit such as a driver. The light valve drive section 143 generates drive voltages based on the drive signal provided from the image processing section 141. The light valve drive section 143 applies the drive voltages to the liquid crystal light valves 145 to thereby drive the liquid crystal light valves 145.

The light source 144 is, for example, an LED (light emitting diode). The light source 144 is not limited to the LED, but can also be, for example, a xenon lamp, a super-high pressure mercury lamp, or a laser source. The light source 144 emits the light. The light emitted from the light source 144 enters an integrator optical system not shown. The integrator optical system reduces the variation in luminance distribution in the incident light. The light emitted from the light source 144 passes through the integrator optical system, and is then separated by a color separation optical system not shown into colored light components of red, green, and blue as the three primary colors of light. The red colored light component enters the red-color liquid crystal light valve 145R. The green colored light component enters the green-color liquid crystal light valve 145G. The blue colored light component enters the blue-color liquid crystal light valve 145B.

The liquid crystal light valves 145 are each formed of a liquid crystal panel having a liquid crystal material existing between a pair of transparent substrates, and so on. The liquid crystal light valves 145 each have a pixel area 145a having a rectangular shape and including a plurality of pixels 145p arranged in a matrix. In each of the liquid crystal light valves 145, a drive voltage based on the image signal is applied to the liquid crystal for each of the pixels 145p. When the light valve drive section 143 applies the drive voltages to the respective pixels 145p, the light transmittance of each of the pixels 145p is set to the light transmittance based on the drive voltage. The light emitted from the light source 144 passes through the pixel area 145a to thereby be modulated. Therefore, the image based on the image signal is formed for each colored light. The liquid crystal light valves 145 are an example of a light modulation device.

The images of the respective colors are combined by a color combining optical system not shown for each of the pixels 145p. Therefore, a color image is generated. The color image is projected via the projection optical system 146. The projection optical system 146 is a projection lens which can be shifted. The projection optical system 146 is shifted by a lens shift mechanism not shown. Due to the shift of the projection optical system 146, the position in the display surface 3 of the image to be projected from the projection optical system 146 is displaced. Furthermore, the displacement of the image in the display surface 3 is determined by the shift amount of the projection optical system 146.

The camera 15 includes a light receiving optical system 151 such as a lens, and an imaging element 152 for converting the light collected by the light receiving optical system 151 into an electric signal. The imaging element 152 is, for example, a CCD (Charge Coupled Device) image sensor for receiving the light in, for example, an infrared region and a visible light region. The imaging element 152 is not limited to the CCD image sensor, but can also be a CMOS (Complementary Metal Oxide Semiconductor) image sensor for receiving the light in, for example, the infrared region and the visible light region.

The camera 15 images the display surface 3 to thereby generate imaging data. The camera 15 of the first specific projector 1A takes the first projection image F1 displayed on the display surface 3 to thereby generate first imaging data. The camera 15 of the second specific projector 1B takes the second projection image F2 displayed on the display surface 3 to thereby generate second imaging data. The camera 15 of the third specific projector 1C takes the third projection image F3 displayed on the display surface 3 to thereby generate third imaging data. The camera 15 of the fourth specific projector 1D takes the fourth projection image F4 displayed on the display surface 3 to thereby generate fourth imaging data.

The camera 15 can be disposed as a separate member from the projector 1. In this case, the camera 15 and the projector 1 are coupled to each other with a wired or wireless interface so as to be able to perform transmission/reception of data.

The first storage section 16 is a recording medium which can be read by the first processing section 17. The first storage section 16 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM.

The first storage section 16 stores a control program to be executed by the first processing section 17, and a variety of types of data to be used by the first processing section 17.

The first processing section 17 is formed of, for example, a single processor, or a plurality of processors. Citing an example, the first processing section 17 is formed of a signal CPU (Central Processing Unit) or a plurality of CPUs. Some or all of the functions of the first processing section 17 can also be realized by a circuit such as a DSP (Digital Signal Processor), an ASIC (Application Specific Integrated Circuit), a PLD (Programmable Logic Device), or an FPGA (Field Programmable Gate Array). The first processing section 17 executes a plurality of types of processing in parallel or in sequence. The first processing section 17 retrieves the control program from the first storage section 16. The first processing section 17 executes the control program to thereby realize an operation control section 171 and an image quality correction section 173.

The operation control section 171 controls a variety of operations of the projector 1. For example, the operation control section 171 controls the first communication section 13, the projection section 14, and the camera 15.

Citing an example, the operation control section 171 controls the image processing section 141, the light valve drive section 143, and the light source 144 to thereby make the projection section 14 project the image. The operation control section 171 makes the camera 15 take the image. The operation control section 171 makes the first communication section 13 transmit the imaging data to the control device 2.

The image quality correction section 173 corrects the image quality of the image projected from the projection section 14. The image quality correction section 173 controls the image processing section 141 in accordance with, for example, a variety of types of correction data to thereby correct the brightness of the image and the color of the image.

In the initial state, the image quality correction section 173 makes the image processing section 141 correct the image signal based on initial brightness correction data set in advance to thereby correct the brightness of the projection image from the brightness represented by the image signal having not yet been corrected into the brightness represented by the image signal having been corrected. The initial brightness correction data is set before the shipment of the projector 1 in order to reduce the shift from a reference in the brightness of the image based on, for example, the individual difference of the projector 1.

Further, when there exist brightness correction data described later and provided from the control device 2, and the initial brightness correction data, the image quality correction section 173 makes the image processing section 141 correct the image signal based on the initial brightness correction data and the brightness correction data provided from the control device 2 to thereby correct the brightness of the projection image from the brightness represented by the image signal having not yet been corrected into the brightness represented by the image signal having been corrected.

When there exist the brightness correction data described later and provided from the control device 2, the initial brightness correction data, and user-set brightness correction data set by the user, the image quality correction section 173 makes the image processing section 141 correct the image signal based on the initial brightness correction data, the user-set brightness correction data, and the brightness correction data provided from the control device 2. Therefore, the brightness of the projection image changes from the brightness represented by the image signal having not yet been corrected to the brightness represented by the image signal having been corrected.

The user-set brightness correction data is set by the user when the user adjusts the brightness of the image.

Further, in the initial state, the image quality correction section 173 makes the image processing section 141 correct the image signal based on initial color correction data set in advance to thereby correct the colors of the projection image from the colors represented by the image signal having not yet been corrected into the colors represented by the image signal having been corrected. The initial color correction data is an example of initial correction data. The image signal having been corrected is an example of a first corrected image signal.

The initial color correction data is set before the shipment of the projector 1 in order to reduce the shift from a reference in the colors of the image based on, for example, the individual difference of the projector 1.

Further, when there exists color correction data described later and provided from the control device 2, the image quality correction section 173 makes the image processing section 141 correct the image signal based on the initial color correction data and the color correction data provided from the control device 2 to thereby correct the colors of the projection image from the colors represented by the image signal having not yet been corrected into the colors represented by the image signal having been corrected.

When there exist the color correction data described later and provided from the control device 2, the initial color correction data, and user-set color correction data set by the user, the image quality correction section 173 makes the image processing section 141 correct the image signal based on the initial color correction data, the user-set color correction data, and the color correction data provided from the control device 2. Therefore, the colors of the projection image change from the colors represented by the image signal having not yet been corrected to the colors represented by the image signal having been corrected.

The user-set color correction data is set by the user when the user adjusts the colors of the image.

A3: One Example of Control Device 2

FIG. 6 is a diagram showing an example of the control device 2. The control device 2 includes a second operation section 21, a second communication section 22, a second storage section 23, and a second processing section 24.

The second operation section 21 corresponds to, for example, a keyboard, operating buttons, or a touch panel. The second operation section 21 receives an input operation by the user.

The second communication section 22 communicates with each of the first specific projector 1A through the fourth specific projector 1D. Specifically, the second communication section 22 communicates with the first communication section 13 via the wired LAN. The communication format between the second communication section 22 and the first communication section 13 is not limited to the wired LAN. The second communication section 22 receives the first imaging data, the second imaging data, the third imaging data, and the fourth imaging data.

The second storage section 23 is a recording medium which can be read by the second processing section 24. The second storage section 23 includes, for example, a nonvolatile memory and a volatile memory. The second storage section 23 stores a control program to be executed by the second processing section 24, and a variety of types of data to be used by the second processing section 24.

The second processing section 24 is formed of, for example, a single processor, or a plurality of processors. Citing an example, the second processing section 24 is formed of a signal CPU or a plurality of CPUs. Some or all of the functions of the second processing section 24 can be realized by a circuit such as a DSP, an ASIC, a PLD, or an FPGA. The second processing section 24 executes a plurality of types of processing in parallel or in sequence. The second processing section 24 retrieves the control program from the second storage section 23. The second processing section 24 executes the control program retrieved from the second storage section 23 to thereby realize a brightness estimation section 241, an identification section 242, a brightness control section 243, a color estimation section 244, a color average calculation section 245, a color control section 247, and an instruction section 248.

The brightness estimation section 241 estimates the brightness of the first projection image F1 to be projected by the first specific projector 1A in the first area 31 based on a white image signal representing white. The white image signal is an example of a first image signal and a second image signal. Hereinafter, the first projection image F1 projected in the first area 31 based on the white image signal is referred to as a "first white image F1W." The first white image F1W is an example of a first image. The brightness estimation section 241 estimates the brightness of the first white image F1W using the first imaging data representing the first white image F1W. During the period in which the imaging for generating the first imaging data representing the first white image F1W is performed, the second specific projector 1B through the fourth specific projector 1D each project a black image based on a black image signal. It should be noted that during the period in which the imaging for generating the first imaging data representing the first white image F1W is performed, it is possible for each of the third specific projector 1C and the fourth specific projector 1D to project an image different from the black image such as an image based on the white image signal.

The brightness estimation section 241 estimates the brightness of the second projection image F2 to be projected by the second specific projector 1B in the first area 31 based on the white image signal. Hereinafter, the second projection image F2 projected in the first area 31 based on the white image signal is referred to as a "second white image F2W." The second white image F2W is an example of a second image. The brightness estimation section 241 estimates the brightness of the second white image F2W using the second imaging data representing the second white image F2W. During the period in which the imaging for generating the second imaging data representing the second white image F2W is performed, the first specific projector 1A, the third specific projector 1C, and the fourth specific projector 1D each project a black image based on the black image signal. It should be noted that during the period in which the imaging for generating the second imaging data representing the second white image F2W is performed, it is possible for each of the third specific projector 1C and the fourth specific projector 1D to project an image different from the black image such as an image based on the white image signal.

The brightness estimation section 241 estimates the brightness of the third projection image F3 to be projected by the third specific projector 1C in the second area 32 based on the white image signal. Hereinafter, the third projection image F3 projected in the second area 32 based on the white image signal is referred to as a "third white image F3W." The third white image F3W is an example of the first image. The first white image F1W and the third white image F3W are an example of a plurality of first images and a plurality of images. The brightness estimation section 241 estimates the brightness of the third white image F3W using the third imaging data representing the third white image F3W. During the period in which the imaging for generating the third imaging data representing the third white image F3W is performed, the first specific projector 1A, the second specific projector 1B, and the fourth specific projector 1D each project a black image based on the black image signal. It should be noted that during the period in which the imaging for generating the third imaging data representing the third white image F3W is performed, it is possible for each of the first specific projector 1A and the second specific projector 1B to project an image different from the black image such as an image based on the white image signal.

The brightness estimation section 241 estimates the brightness of the fourth projection image F4 to be projected by the fourth specific projector 1D in the second area 32 based on the white image signal. Hereinafter, the fourth projection image F4 projected in the second area 32 based on the white image signal is referred to as a "fourth white image F4W." The fourth white image F4W is an example of the second image. The second white image F2W and the fourth white image F4W are an example of a plurality of second images and the plurality of images. The brightness estimation section 241 estimates the brightness of the fourth white image F4W using the fourth imaging data representing the fourth white image F4W. During the period in which the imaging for generating the fourth imaging data representing the fourth white image F4W is performed, the first specific projector 1A through the third specific projector 1C each project a black image based on the black image signal. It should be noted that during the period in which the imaging for generating the fourth imaging data representing the fourth white image F4W is performed, it is possible for each of the first specific projector 1A and the second specific projector 1B to project an image different from the black image such as an image based on the white image signal.

It should be noted that the first specific projector 1A through the fourth specific projector 1D each correct the white image signal based on at least the initial color correction data and the initial brightness correction data to thereby generate the white image signal having been corrected. Further, the first specific projector 1A through the fourth specific projector 1D each project the image represented by the white image signal having been corrected.

Therefore, when the first specific projector 1A through the fourth specific projector 1D are different in initial brightness correction data from each other, the first white image F1W through the fourth white image F4W are different in brightness from each other.

Further, even when the first specific projector 1A through the fourth specific projector 1D are not different in initial brightness correction data from each other, there is a possibility that the first white image F1W through the fourth white image F4W are different in brightness from each other based on the individual difference between the first specific projector 1A through the fourth specific projector 1D.

The identification section 242 identifies a first dark image which is the darkest one of the first white image F1W and the third white image F3W, and a first adjustment target image which is one of the first white image F1W and the third white image F3W, and is different from the first dark image based on the result of the brightness estimation of the first white image F1W and the third white image F3W.

The identification section 242 identifies a second dark image which is the darkest one of the second white image F2W and the fourth white image F4W, and a second adjustment target image which is one of the second white image F2W and the fourth white image F4W, and is different from the second dark image based on the result of the brightness estimation of the second white image F2W and the fourth white image F4W.

FIG. 7 shows an example of the first image and the second image. Further, FIG. 8 shows an example of the first dark image, the first adjustment target image, the second dark image, and the second adjustment target image.

When the first white image F1W is the first adjustment target image, the brightness control section 243 controls the first specific projector 1A to thereby approximate the brightness of the first adjustment target image to the brightness of the first dark image.

When the third white image F3W is the first adjustment target image, the brightness control section 243 controls the third specific projector 1C to thereby approximate the brightness of the first adjustment target image to the brightness of the first dark image.

When the second white image F2W is the second adjustment target image, the brightness control section 243 controls the second specific projector 1B to thereby approximate the brightness of the second adjustment target image to the brightness of the second dark image.

When the fourth white image F4W is the second adjustment target image, the brightness control section 243 controls the fourth specific projector 1D to thereby approximate the brightness of the second adjustment target image to the brightness of the second dark image.

The color estimation section 244 estimates the value of the color of the first projection image F1 to be projected by the first specific projector 1A in the first area 31 based on a red image signal representing solid red.

The value of the color is represented by a combination of a value of a red component in the image, a value of a green component in the image, and a value of a blue component in the image. The value of the color is not limited to the combination of the value of the red component, the value of the green component, and the value of the blue component. For example, it is possible for the value of the color to be represented by XYZ values defined in the XYZ color system.

Hereinafter, the first projection image F1 projected in the first area 31 based on the red image signal is referred to as a "first red image F1." The first red image F11 is an example of a third image. The third image is not limited to the first red image F11. The third image projected by the first specific projector 1A can be an image projected based on a green image signal representing solid green, or can also be an image projected based on a blue image signal representing solid blue. The red image signal is an example of a third image signal. The third image signal is not limited to the red image signal. For example, the third image signal can be the green image signal, or can also be the blue image signal. The color estimation section 244 estimates the value of the color of the first red image F1 using the first imaging data representing the first red image F11.

During the period in which the imaging for generating the first imaging data representing the first red image F11 is performed, the second specific projector 1B through the fourth specific projector 1D each project a black image based on the black image signal.

It should be noted that during the period in which the imaging for generating the first imaging data representing the first red image F11 is performed, it is possible for each of the third specific projector 1C and the fourth specific projector 1D to project an image different from the black image such as an image based on the red image signal.

The color estimation section 244 estimates the value of the color of the second projection image F2 to be projected by the second specific projector 1B in the first area 31 based on the red image signal.

Hereinafter, the second projection image F2 projected in the first area 31 based on the red image signal is referred to as a "second red image F22." The second red image F22 is an example of the third image. The color estimation section 244 estimates the value of the color of the second red image F22 using the second imaging data representing the second red image F22. During the period in which the imaging for generating the second imaging data representing the second red image F22 is performed, the first specific projector 1A, the third specific projector 1C, and the fourth specific projector 1D each project a black image based on the black image signal.

It should be noted that during the period in which the imaging for generating the second imaging data representing the second red image F22 is performed, it is possible for each of the third specific projector 1C and the fourth specific projector 1D to project an image different from the black image such as an image based on the red image signal.

The color estimation section 244 estimates the value of the color of the third projection image F3 to be projected by the third specific projector 1C in the second area 32 based on the red image signal.

Hereinafter, the third projection image F3 projected in the second area 32 based on the red image signal is referred to as a "third red image F33." The third red image F33 is an example of the third image. The color estimation section 244 estimates the value of the color of the third red image F33 using the third imaging data representing the third red image F33. During the period in which the imaging for generating the third imaging data representing the third red image F33 is performed, the first specific projector 1A, the second specific projector 1B, and the fourth specific projector 1D each project a black image based on the black image signal.

It should be noted that during the period in which the imaging for generating the third imaging data representing the third red image F33 is performed, it is possible for each of the first specific projector 1A and the second specific projector 1B to project an image different from the black image such as an image based on the red image signal.

The color estimation section 244 estimates the value of the color of the fourth projection image F4 to be projected by the fourth specific projector 1D in the second area 32 based on the red image signal.

Hereinafter, the fourth projection image F4 projected in the second area 32 based on the red image signal is referred to as a "fourth red image F44." The fourth red image F44 is an example of the third image. The first red image F11 through the fourth red image F44 are an example of the plurality of third images. The color estimation section 244 estimates the value of the color of the fourth red image F44 using the fourth imaging data representing the fourth red image F44. During the period in which the imaging for generating the fourth imaging data representing the fourth red image F44 is performed, the first specific projector 1A through the third specific projector 1C each project a black image based on the black image signal.

It should be noted that during the period in which the imaging for generating the fourth imaging data representing the fourth red image F44 is performed, it is possible for each of the first specific projector 1A and the second specific projector 1B to project an image different from the black image such as an image based on the red image signal.

The first specific projector 1A through the fourth specific projector 1D each correct the red image signal based on at least the initial color correction data and the initial brightness correction data to thereby generate the red image signal having been corrected. Further, the first specific projector 1A through the fourth specific projector 1D each project the image represented by the red image signal having been corrected.

Therefore, when the first specific projector 1A through the fourth specific projector 1D are different in initial color correction data from each other, the first red image F1 through the fourth red image F44 are different in value of the color from each other.

Further, even when the first specific projector 1A through the fourth specific projector 1D are not different in initial color correction data from each other, there is a possibility that the first red image F11 through the fourth red image F44 are different in value of the color from each other based on the individual difference between the first specific projector 1A through the fourth specific projector 1D.

The color average calculation section 245 obtains an average of the value of the color of the first red image F1 and the value of the color of the third red image F33 based on the result of the estimation by the color estimation section 244. Hereinafter, the average of the value of the color of the first red image F11 and the value of the color of the third red image F33 is referred to as a "first average value."

Further, the color average calculation section 245 obtains an average of the value of the color of the second red image F22 and the value of the color of the fourth red image F44 based on the result of the estimation by the color estimation section 244. Hereinafter, the average of the value of the color of the second red image F22 and the value of the color of the fourth red image F44 is referred to as a "second average value."

The color control section 247 identifies a third adjustment target image showing a value of a color different from the first average value out of the first red image F11 and the third red image F33. Further, the color control section 247 identifies a fourth adjustment target image showing a value of a color different from the second average value out of the second red image F22 and the fourth red image F44.

FIG. 9 shows an example of the third image. Further, FIG. 10 shows an example of the third adjustment target image and the fourth adjustment target image.

The color control section 247 controls the projector for projecting the third adjustment target image out of the first specific projector 1A and the third specific projector 1C to thereby approximate the value of the color of the third adjustment target image to the first average value. Further, the color control section 247 controls the projector for projecting the fourth adjustment target image out of the second specific projector 1B and the fourth specific projector 1D to thereby approximate the value of the color of the fourth adjustment target image to the second average value.

The instruction section 248 transmits an instruction to each of the first specific projector 1A through the fourth specific projector 1D. Citing an example, the instruction section 248 transmits an instruction of executing a calibration operation of associating an imaging coordinate in the imaging data generated by the camera 15 and a panel coordinate in the liquid crystal light valve 145 with each other to each of the first specific projector 1A through the fourth specific projector 1D.

A4: Outline of Brightness Control

FIG. 11 is a diagram for describing an outline of the brightness control. In FIG. 11, the brightness of the first white image F1W is defined as 100%. The brightness of the first white image F1W in this case is an example of a first brightness. The brightness of the second white image F2W is assumed to be 90% of the brightness of the first white image F1W. The brightness of the second white image F2W in this case is an example of a second brightness. The brightness of the third white image F3W is assumed to be 80% of the brightness of the first white image F1W. The brightness of the third white image F3W in this case is an example of a third brightness. The brightness of the fourth white image F4W is assumed to be 85% of the brightness of the first white image F1W. The brightness of the fourth white image F4W in this case is an example of a fourth brightness.

In this case, the identification section 242 identifies the third white image F3W as the first dark image. The identification section 242 identifies the first white image F1W as the first adjustment target image. The identification section 242 identifies the fourth white image F4W as the second dark image. The identification section 242 identifies the second white image F2W as the second adjustment target image.

The brightness control section 243 controls the first specific projector 1A to thereby reduce the brightness of the first white image F1W from 100% to 80%. Therefore, the brightness of the first white image F1W approximates to the brightness of the third white image F3W, and the brightness of the first white image F1W coincides with the brightness of the third white image F3W. In this case, the first composite image E1 is displayed with the third brightness. Therefore, the unevenness in brightness in the first composite image E1 decreases.

Further, the brightness control section 243 controls the second specific projector 1B to thereby reduce the brightness of the second white image F2W from 90% to 85%. Therefore, the brightness of the second white image F2W approximates to the brightness of the fourth white image F4W. Then, the brightness of the second white image F2W coincides with the brightness of the fourth white image F4W. In this case, the second composite image E2 is displayed with the fourth brightness. Therefore, the unevenness in brightness in the second composite image E2 decreases.

Therefore, in the image having the first composite image E1 superimposed on the second composite image E2, the unevenness in brightness decreases. Further, the image obtained by performing the stack projection on the first composite image E1 as the result of the tiling projection and the second composite image E2 as the result of the tiling projection becomes brighter than the first brightness, the second brightness, the third brightness, and the fourth brightness.

It should be noted that the brightness control can use not only the white image but also an image including at least a G component as a green component. For example, it is also possible to use a G image as a solid color image, or a solid color image using an R+G+B image. Further, the color adjustment can be performed for white, or each of the solid colors of R, G, and B.

A5: Calibration Operation

Figure 12:
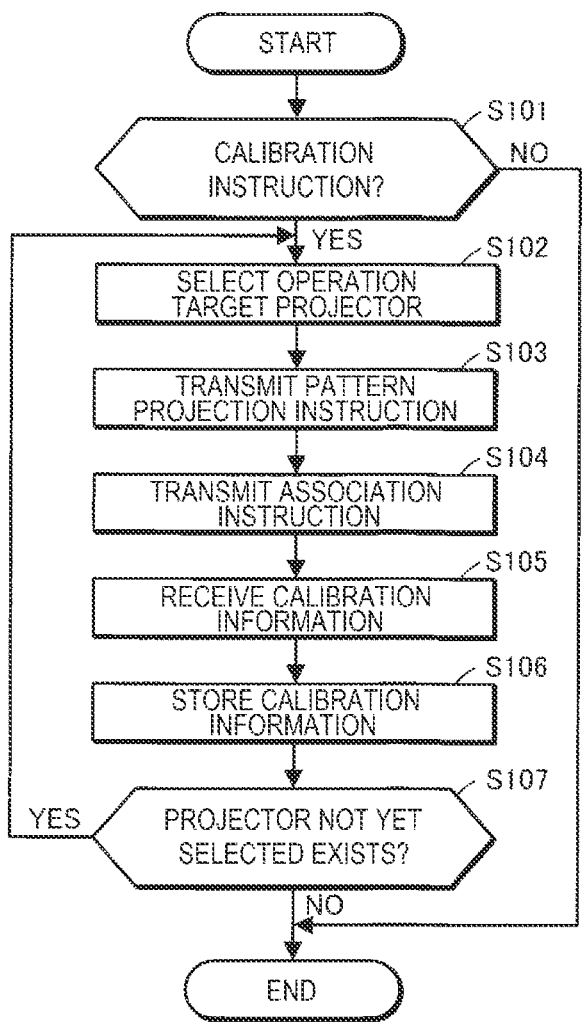
FIG. 12 is a flowchart for explaining a calibration operation.

FIG. 12 is a flowchart for explaining the calibration operation of associating the imaging coordinate and the panel coordinate with each other. Hereinafter, it is assumed that the first specific projector 1A through the fourth specific projector 1D are each projecting the black image based on the black image signal.

When the second operation section 21 receives in the step S101 a calibration instruction of executing the calibration operation, the instruction section 248 selects in the step S102 one operation target projector from the projectors not yet selected as the operation target projector out of the first specific projector 1A through the fourth specific projector 1D.

Subsequently, in the step S103, the instruction section 248 transmits a pattern projection instruction from the second communication section 22 to the operation target projector.

In the operation target projector, when the first communication section 13 receives the pattern projection instruction, the operation control section 171 makes the projection section 14 project a pattern image to the display surface 3. The pattern image is, for example, a grid pattern. On the four corners of the pattern image, there are formed predetermined marks. The predetermined marks are used when detecting the four corners of the pattern image. When the first storage section 16 stores pattern image data representing the pattern image, the operation control section 171 retrieves the pattern image data from the first storage section 16. Subsequently, the operation control section 171 outputs the image signal representing the pattern image data to the image processing section 141 to thereby make the projection section 14 project the pattern image toward the display surface 3.

After transmitting the pattern projection instruction, the instruction section 248 transmits in the step S104 an association instruction from the second communication section 22 to the operation target projector.

In the operation target projector, when the first communication section 13 receives the association instruction, the operation control section 171 makes the camera 15 perform imaging. The camera 15 performs imaging to thereby generate the imaging data.

The operation control section 171 associates the coordinate in the imaging data and the coordinate in the liquid crystal light valves 145 with each other. The coordinate in the imaging data is also referred to as an imaging coordinate. The coordinate in the liquid crystal light valves 145 is also referred to as a panel coordinate. Specifically, the operation control section 171 firstly detects a mark in the pattern image represented by the imaging data. Subsequently, the operation control section 171 identifies the position of the pixel representing the mark in the imaging data, namely the imaging coordinate of the mark in the imaging data. Subsequently, the operation control section 171 identifies the position of the pixel representing the mark in the liquid crystal light valve 145, namely the panel coordinate of the mark in the liquid crystal light valves 145. Subsequently, the operation control section 171 generates calibration information having the imaging coordinate of the mark in the imaging data and the panel coordinate of the mark in the liquid crystal light valves 145 associated with each other. In the calibration information, the imaging coordinate and the panel coordinate are associated with each other. The calibration information can also be referred to as coordinate conversion information.

The position of the pixel representing the mark in the liquid crystal light valves 145 can be stored in, for example, the first storage section 16 in advance. In this case, it is also possible for the operation control section 171 to obtain the position of the pixel representing the mark in the liquid crystal light valves 145 from the first storage section 16.

Further, it is also possible for the operation control section 171 to identify the position of the pixel representing the mark in the liquid crystal light valves 145 based on the position of the pixel representing the mark in the frame memory 142 when the image processing section 141 develops the pattern image in the frame memory 142. In this case, the first storage section 16 stores, in advance, position association information for associating the position of the pixel in the frame memory 142 and the position of the pixel in the liquid crystal light valves 145 with each other. The operation control section 171 uses the position association information to thereby identify the position of the pixel representing the mark in the liquid crystal light valves 145 based on the position of the pixel representing the mark in the frame memory 142.

Subsequently, the operation control section 171 makes the projection section 14 terminate the projection of the pattern image.

Subsequently, the operation control section 171 transmits the calibration information from the first communication section 13 to the control device 2. It should be noted that it is also possible for the operation control section 171 to make the projection section 14 terminate the projection of the pattern image after the transmission of the calibration information without making the projection section 14 terminate the projection of the pattern image before the transmission of the calibration information.

When the second communication section 22 receives in the step S105 the calibration information from the operation target projection, the instruction section 248 stores in the step S106 the calibration information in the second storage section 23.

Subsequently, in the step S107, the instruction section 248 determines whether or not there exists a projector not yet selected as the operation target projector in the first specific projector 1A through the fourth specific projector 1D.

When there exists a projector not yet selected in the step S107, the process returns to the step S102. In the step S102, for example, the instruction section 248 selects the operation target projector in the order of the first specific projector 1A, the second specific projector 1B, the third specific projector 1C, and the fourth specific projector 1D. The order in the selection of the operation target projector is not limited to the order of the first specific projector 1A, the second specific projector 1B, the third specific projector 1C, and the fourth specific projector 1D, and can arbitrarily be changed.

When there exists no projector not yet selected in the step S107, the operation shown in FIG. 12 is terminated.

A6: Brightness Adjustment Operation

Figure 13:
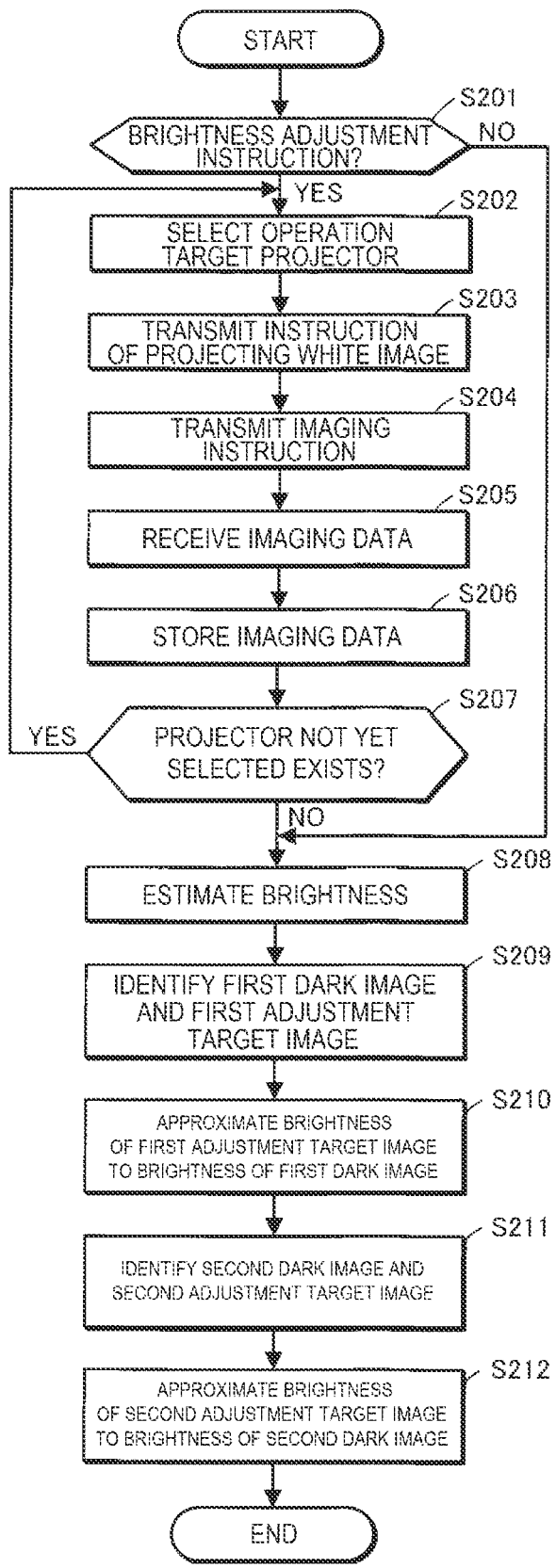
FIG. 13 is a flowchart for explaining a brightness adjustment operation.

FIG. 13 is a flowchart for explaining a brightness adjustment operation. Hereinafter, it is assumed that the first specific projector 1A through the fourth specific projector 1D are each projecting the black image based on the black image signal.

When the second operation section 21 receives in the step S201 a brightness adjustment instruction of performing the brightness adjustment, the brightness estimation section 241 selects in the step S202 the operation target projector. The operation in the step S202 is substantially the same as the operation in the step S102 described above.

Subsequently, in the step S203, the brightness estimation section 241 transmits an instruction of projecting the white image from the second communication section 22 to the operation target projector.

In the operation target projector, when the first communication section 13 receives the instruction of projecting the white image, the operation control section 171 makes the projection section 14 project an image based on the white image signal to the display surface 3. The white image signal represents a white image of solid white. The white image signal represents the highest gray level of the settable gray levels as the gray level of the white image. It should be noted that the gray level of the white image can be a different gray level from the highest gray level of the settable gray levels. When the first storage section 16 stores white image data representing the white image, the operation control section 171 retrieves the white image data from the first storage section 16. Subsequently, the operation control section 171 outputs the white image signal representing the white image data to the image processing section 141 to thereby make the projection section 14 project the image based on the white image signal toward the display surface 3. Therefore, for example, when the first specific projector 1A is selected as the operation target projector, the first white image F1W is displayed in the first area 31. Further, when the second specific projector 1B is selected as the operation target projector, the second white image F2W is displayed in the first area 31.

After the transmission of the instruction of projecting the white image, in the step S204, the brightness estimation section 241 transmits an imaging instruction from the second communication section 22 to the operation target projector.

In the operation target projector, when the first communication section 13 receives the imaging instruction, the operation control section 171 makes the camera 15 perform imaging. For example, when the operation target projector is the first specific projector 1A, the camera 15 in the first specific projector 1A takes the first white image F1W displayed in the first area 31 to thereby generate the first imaging data.

Subsequently, the operation control section 171 transmits the imaging data generated by the camera 15 from the first communication section 13 to the control device 2.

When the second communication section 22 receives the imaging data in the step S205, the brightness estimation section 241 stores in the step S206 the imaging data received by the second communication section 22 in the second storage section 23. Subsequently, the brightness estimation section 241 transmits an instruction of projecting the black image from the second communication section 22 to the operation target projector. The operation target projector projects the black image in accordance with the instruction of projecting the black image.

Subsequently, in the step S207, the brightness estimation section 241 determines whether or not there exists a projector not yet selected. The operation in the step S207 is substantially the same as the operation in the step S107 described above.

When there exists a projector not yet selected in the step S207, the process returns to the step S202. When there exists no projector not yet selected in the step S207, the brightness estimation section 241 estimates in the step S208 the brightness of each of the first white image F1W through the fourth white image F4W based on the imaging data stored in the second storage section 23.

For example, the brightness estimation section 241 firstly identifies the pixel area representing the first white image F1W from the first imaging data using the calibration information of the first specific projector 1A. Subsequently, the brightness estimation section 241 estimates the average in luminance of the pixels in the pixel area representing the first white image F1W as the brightness of the first white image F1W.

It should be noted that it is also possible for the brightness estimation section 241 to estimate the luminance represented by the pixel located at a specific position in the pixel area representing the first white image F1W, for example, the center of the pixel area, as the brightness of the first white image F1W. In this case, the process of calculating the average in luminance can be made unnecessary. The specific position in the pixel area representing the first white image F1W is not limited to the central position of the pixel area representing the first white image F1W, and can also be a position different from the central position of the pixel area representing the first white image F1W.

The brightness estimation section 241 estimates the brightness of each of the second white image F2W through the fourth white image F4W using substantially the same method as the method used when estimating the brightness of the first white image F1W.

Subsequently, in the step S209, the identification section 242 identifies a darker image of the first white image F1W and the third white image F3W as the first dark image based on the result of the estimation by the brightness estimation section 241, and identifies the other image as the first adjustment target image.

When the brightness of the first white image F1W is equal to the brightness of the third white image F3W, the identification section 242 identifies one of the first white image F1W and the third white image F3W, for example, the first white image F1W, as the first dark image, and identifies the other of the first white image F1W and the third white image F3W, for example, the third white image F3W, as the first adjustment target image. It should be noted that when the brightness of the first white image F1W is equal to the brightness of the third white image F3W, the step S209 and the step S210 described later can be eliminated.

After the completion of the step S209, in the step S210, when the first white image F1W is the first adjustment target image, the brightness control section 243 controls only the first specific projector 1A to thereby approximate the brightness of the first adjustment target image to the brightness of the first dark image.

For example, the brightness control section 243 generates first brightness correction data representing a difference between the brightness of the first adjustment target image and the brightness of the first dark image. Subsequently, the brightness control section 243 transmits the instruction of projecting the white image from the second communication section 22 to each of the first specific projector 1A and the third specific projector 1C. Subsequently, the brightness control section 243 transmits the first brightness correction data from the second communication section 22 only to the first specific projector 1A to thereby make the brightness of the first white image F1W projected by the first specific projector 1A darker as much as the brightness represented by the brightness correction data. Here, in the first specific projector 1A, when receiving the brightness correction data, the brightness of the first white image F1W is made darker as much as the brightness represented by the brightness correction data.

When the third white image F3W is the first adjustment target image, the brightness control section 243 controls only the third specific projector 1C to thereby approximate the brightness of the first adjustment target image to the brightness of the first dark image.

The method of approximating the brightness of the first adjustment target image to the brightness of the first dark image when the third white image F3W is the first adjustment target image is substantially the same as the method of approximating the brightness of the first adjustment target image to the brightness of the first dark image when the first white image F1W is the first adjustment target image.

Subsequently, in the step S211, the identification section 242 identifies a darker image of the second white image F2W and the fourth white image F4W as the second dark image based on the result of the estimation by the brightness estimation section 241, and identifies the other image as the second adjustment target image.

When the brightness of the second white image F2W is equal to the brightness of the fourth white image F4W, the identification section 242 identifies one of the second white image F2W and the fourth white image F4W, for example, the second white image F2W, as the second dark image, and identifies the other of the second white image F2W and the fourth white image F4W, for example, the fourth white image F4W, as the second adjustment target image. It should be noted that when the brightness of the second white image F2W is equal to the brightness of the fourth white image F4W, the step S211 and the step S212 described later can be eliminated.

After the completion of the step S211, in the step S212, when the second white image F2W is the second adjustment target image, the brightness control section 243 controls only the second specific projector 1B to thereby approximate the brightness of the second adjustment target image to the brightness of the second dark image.

The method of approximating the brightness of the second adjustment target image to the brightness of the second dark image when the second white image F2W is the second adjustment target image is substantially the same as the method of approximating the brightness of the first adjustment target image to the brightness of the first dark image when the first white image F1W is the first adjustment target image.

When the fourth white image F4W is the second adjustment target image, the brightness control section 243 controls only the fourth specific projector 1D to thereby approximate the brightness of the second adjustment target image to the brightness of the second dark image.

The method of approximating the brightness of the second adjustment target image to the brightness of the second dark image when the fourth white image F4W is the second adjustment target image is substantially the same as the method of approximating the brightness of the first adjustment target image to the brightness of the first dark image when the first white image F1W is the first adjustment target image.

A7: Color Adjustment Operation

Figure 14:
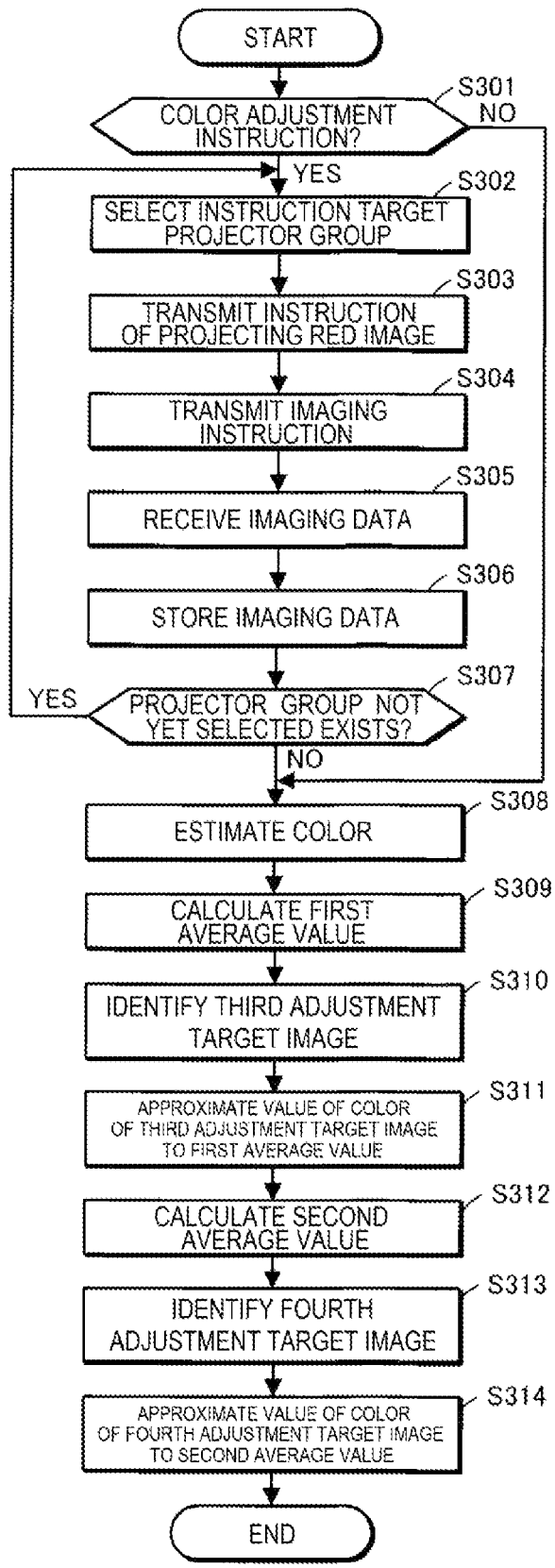
FIG. 14 is a flowchart for explaining a color adjustment operation.

FIG. 14 is a flowchart for explaining a color adjustment operation. Hereinafter, it is assumed that the first specific projector 1A through the fourth specific projector 1D are each projecting the black image based on the black image signal.

When the second operation section 21 receives in the step S301 a color adjustment instruction of executing the color adjustment, the color estimation section 244 selects in the step S302 one instruction target projector from the projectors not yet selected as the instruction target projector out of the first specific projector 1A through the fourth specific projector 1D.

Subsequently, in the step S303, the color estimation section 244 transmits an instruction of projecting the red image from the second communication section 22 to the instruction target projector.

In the instruction target projector, when the first communication section 13 receives the instruction of projecting the red image, the operation control section 171 makes the projection section 14 project an image based on the red image signal to the display surface 3. The red image signal represents an intermediate gray level of the settable gray levels as the gray level of the red image. It should be noted that the gray level of the red image can be different from the intermediate gray level. When the first storage section 16 stores red image data representing the red image, the operation control section 171 retrieves the red image data from the first storage section 16. Subsequently, the operation control section 171 outputs the red image signal representing the red image data to the image processing section 141 to thereby make the projection section 14 project the image based on the red image signal to the display surface 3. Therefore, for example, when the first specific projector 1A is selected as the instruction target projector, the first red image F11 is displayed in the first area 31. Further, when the second specific projector 1B is selected as the instruction target projector, the second red image F22 is displayed in the first area 31.

After the transmission of the instruction of projecting the red image, in the step S304, the color estimation section 244 transmits the imaging instruction from the second communication section 22 to the instruction target projector.

In the instruction target projector, when the first communication section 13 receives the imaging instruction, the operation control section 171 makes the camera 15 perform imaging. For example, when the instruction target projector is the first specific projector 1A, the camera 15 in the first specific projector 1A takes the first red image F11 displayed in the first area 31 to thereby generate the first imaging data.

Subsequently, the operation control section 171 transmits the imaging data generated by the camera 15 from the first communication section 13 to the control device 2.

When the second communication section 22 receives the imaging data in the step S305, the color estimation section 244 stores in the step S306 the imaging data received by the second communication section 22 in the second storage section 23. Subsequently, the color estimation section 244 transmits an instruction of projecting the black image from the second communication section 22 to the instruction target projector. The instruction target projector projects the black image in accordance with the instruction of projecting the black image.

Subsequently, in the step S307, the color estimation section 244 determines whether or not there exists a projector not yet selected as the instruction target projector in the first specific projector 1A through the fourth specific projector 1D.

When there exists a projector not yet selected in the step S307, the process returns to the step S302. In the step S302, for example, the color estimation section 244 selects the instruction target projector in the order of the first specific projector 1A, the second specific projector 1B, the third specific projector 1C, and the fourth specific projector 1D. The order in the selection of the instruction target projector is not limited to the order of the first specific projector 1A, the second specific projector 1B, the third specific projector 1C, and the fourth specific projector 1D, and can arbitrarily be changed.

When there exists no projector not yet selected in the step S307, the color estimation section 244 estimates in the step S308 the value of the color of each of the first red image F11 through the fourth red image F44 based on the imaging data stored in the second storage section 23 in the step S306.

For example, the color estimation section 244 firstly identifies the pixel area representing the first red image F1 from the first imaging data representing the first red image F11 using the calibration information of the first specific projector 1A.

Subsequently, the color estimation section 244 estimates the value of the color represented by the pixel located at the center of the pixel area representing the first red image F11, namely the color represented by a combination of the respective pixel values of red, green, and blue in the pixel located at the center, as the value of the color of the first red image F11.

The pixel located at the center of the pixel area representing the first red image F11 is an example of a predetermined area in the pixel area representing the first red image F11. The predetermined area in the pixel area representing the first red image F11 is not limited to the pixel located at the center of the pixel area representing the first red image F11.

The color estimation section 244 performs the estimation with respect to the value of the color of each of the second red image F22 through the fourth red image F44 using substantially the same method as the estimation method of the value of the color of the first red image F11.

Subsequently, in the step S309, the color average calculation section 245 calculates the first average value based on the estimation result of the value of the color of the first red image F11 and the estimation result of the value of the color of the third red image F33.

For example, the color average calculation section 245 firstly calculates a red component average value as an average of a value of a red component of the first red image F11 and a value of a red component of the third red image F33. Subsequently, the color average calculation section 245 calculates a green component average value as an average of a value of a green component of the first red image F11 and a value of a green component of the third red image F33. Subsequently, the color average calculation section 245 calculates a blue component average value as an average of a value of a blue component of the first red image F11 and a value of a blue component of the third red image F33. Subsequently, the color average calculation section 245 determines the value of the color specified by a combination of the red component average value, the green component average value, and the blue component average value as the first average value. The first average value is used as a target value of the value of the color. The order of the calculation of the red component average value, the green component average value, and the blue component average value can arbitrarily be changed.

Subsequently, in the step S310, the color control section 247 identifies an image having a value of a color different from the first average value out of the first red image F11 and the third red image F33 as the third adjustment target image.

Subsequently, in the step S311, the color control section 247 controls the projector for projecting the third adjustment target image out of the first specific projector 1A and the third specific projector 1C to thereby approximate the value of the color of the third adjustment target image to the first average value.

For example, the color control section 247 generates a difference obtained by subtracting the first average value from the value of the color of the third adjustment target image, specifically a combination of the difference of the value of the red component, the difference of the value of the green component, and the difference of the value of the blue component, as first color correction data. Subsequently, the color control section 247 transmits the instruction of projecting the red image from the second communication section 22 to each of the first specific projector 1A and the third specific projector 1C. Subsequently, the color control section 247 transmits the first color correction data from the second communication section 22 to the projector for projecting the third adjustment target image to thereby make the projector approximate the value of the color of the third adjustment target image to the first average value. Here, in the projector for projecting the third adjustment target image, when receiving the first color correction data, the value of the color of the image currently projected is changed to a value obtained by subtracting the difference represented by the first correction data from the value of the color to thereby approximate the value of the color of the image currently projected to the first average value.

Subsequently, in the step S312, the color average calculation section 245 calculates the second average value based on the estimation result of the value of the color of the second red image F22 and the estimation result of the value of the color of the fourth red image F44. The method of calculating the second average value is substantially the same as the method of calculating the first average value.

Subsequently, in the step S313, the color control section 247 identifies an image having a value of a color different from the second average value out of the second red image F22 and the fourth red image F44 as the fourth adjustment target image.

Subsequently, in the step S314, the color control section 247 controls the projector for projecting the fourth adjustment target image out of the second specific projector 1B and the fourth specific projector 1D to thereby approximate the value of the color of the fourth adjustment target image to the second average value.

The method of approximating the value of the color of the fourth adjustment target image to the second average value is substantially the same as the method of approximating the value of the color of the third adjustment target image to the first average value.

A8: Conclusion of First Embodiment

The control method and the control device 2 according to the disclosure described above include the following aspects.

The brightness estimation section 241 makes the first specific projector 1A project the first white image F1W, and makes the third specific projector 1C project the third white image F3W. The brightness estimation section 241 estimates the brightness of each of the first white image F1W and the third white image F3W. The brightness estimation section 241 makes the second specific projector 1B project the second white image F2W, and makes the fourth specific projector 1D project the fourth white image F4W. The brightness estimation section 241 estimates the brightness of each of the second white image F2W and the fourth white image F4W. The identification section 242 identifies the first dark image which is the darkest, and the first adjustment target image different from the first dark image out of the first white image F1W and the third white image F3W based on the result of the brightness estimation of the first white image F1W and the third white image F3W. The identification section 242 identifies the second dark image which is the darkest, and the second adjustment target image different from the second dark image out of the second white image F2W and the fourth white image F4W based on the result of the brightness estimation of the second white image F2W and the fourth white image F4W. The brightness control section 243 controls the projector for projecting the first adjustment target image to thereby approximate the brightness of the first adjustment target image to the brightness of the first dark image. The brightness control section 243 controls the projector for projecting the second adjustment target image to thereby approximate the brightness of the second adjustment target image to the brightness of the second dark image.

For example, when the first white image F1W is the first adjustment target image, the brightness control section 243 controls the first specific projector 1A to thereby approximate the brightness of the first adjustment target image to the brightness of the first dark image. When the third white image F3W is the first adjustment target image, the brightness control section 243 controls the third specific projector 1C to thereby approximate the brightness of the first adjustment target image to the brightness of the first dark image. When the second white image F2W is the second adjustment target image, the brightness control section 243 controls the second specific projector 1B to thereby approximate the brightness of the second adjustment target image to the brightness of the second dark image. When the fourth white image F4W is the second adjustment target image, the brightness control section 243 controls the fourth specific projector 1D to thereby approximate the brightness of the second adjustment target image to the brightness of the second dark image.

According to this aspect, it is possible to make the image displayed by the projection system 2000 brighter compared to the configuration of making the brightness of the image projected by each of the first specific projector 1A through the fourth specific projector 1D constituting the projection system 2000 coincide with the brightness of the darkest image of the images projected by the first specific projector 1A through the fourth specific projector 1D.

The color estimation section 244 makes the first specific projector 1A project the first red image F1l, and makes the third specific projector 1C project the third red image F33. The color estimation section 244 estimates the value of the color of the first red image F1 to be displayed on the display surface 3. The color estimation section 244 estimates the value of the color of the third red image F33 to be displayed on the display surface 3. The color average calculation section 245 obtains the first average value as the average of the value of the color of the first red image F11 and the value of the color of the third red image F33 based on the estimation result of the value of the color of the first red image F11 and the estimation result of the value of the color of the third red image F33. The color control section 247 identifies the third adjustment target image showing a value of a color different from the first average value out of the first red image F11 and the third red image F33. The color control section 247 controls the projector for projecting the third adjustment target image to thereby approximate the value of the color of the third adjustment target image to the first average value.

According to this aspect, since the target value of the color becomes the average value of the value of the color of the first red image F11 and the value of the color of the third red image F33, it is possible to reduce the degree of the change in color of the third adjustment target image.

A part of the first area 31 overlaps a part of the second area 32. Therefore, it is possible to form each of the first composite image E1 and the second composite image E2 as a single image.

B: Modified Examples

Some aspects of the modifications of the embodiment illustrated hereinabove will be illustrated blow. It is also possible to arbitrarily combine two or more aspects arbitrarily selected from the following illustrations with each other within a range in which the aspects do not conflict with each other.

B1: First Modified Example

In the first embodiment, it is possible for the color average calculation section 245 to select the red image having the value of an allowable color out of the first red image F11 and the third red image F33 as a selected image to obtain the average of the value of the color of the selected image. When the range of the value of the allowable color is stored in the second storage section 23, the color average calculation section 245 selects the red image having the value of the color belonging to the range of the value of the allowable color stored in the second storage section 23 from the first red image F11 and the third red image F33 as the selected image.

In this case, the color control section 247 identifies the third adjustment target image showing the value of the color different from the average of the value of the color of the selected image out of the first red image F11 and the third red image F33, and then controls the projector for projecting the third adjustment target image to thereby approximate the value of the color of the third adjustment target image to the average of the value of the color of the selected image.

According to this aspect, it is possible to eliminate the red image not having the value of the allowable color, for example, the red image low in image quality projected by the projector in which a failure occurs in the image processing, from the images for determining the target value of the color.

B2: Second Modified Example

In the first embodiment, it is possible for the color average calculation section 245 to obtain a third average value as an average of the value of the color of the first red image F11, the value of the color of the second red image F22, the value of the color of the third red image F33, and the value of the color of the fourth red image F44. In this case, the color control section 247 identifies the third adjustment target image showing a value of a color different from the third average value out of the first red image F11 through the fourth red image F44. The color control section 247 controls the projector for projecting the third adjustment target image to thereby approximate the value of the color of the third adjustment target image to the third average value.

According to this aspect, it is possible to uniform the value of the color of the first red image F11, the value of the color of the second red image F22, the value of the color of the third red image F33, and the value of the color of the fourth red image F44 with each other.

B3: Third Modified Example

In the first embodiment, it is possible for the color average calculation section 245 to select the red image having the value of the allowable color from the value of the color of the first red image F11, the value of the color of the second red image F22, the value of the color of the third red image F33, and the value of the color of the fourth red image F44 as the selected image, and then obtain the average of the value of the color of the selected image. When the range of the value of the allowable color is stored in the second storage section 23, the color average calculation section 245 selects the red image having the value of the color belonging to the range of the value of the allowable color stored in the second storage section 23 from the value of the color of the first red image F11, the value of the color of the second red image F22, the value of the color of the third red image F33, and the value of the color of the fourth red image F44 as the selected image.

In this case, the color control section 247 identifies the third adjustment target image showing the value of the color different from the average of the value of the color of the selected image out of the first red image F11, the second red image F22, the third red image F33, and the fourth red image F44, and then controls the projector for projecting the third adjustment target image to thereby approximate the value of the color of the third adjustment target image to the average of the value of the color of the selected image.

According to this aspect, it is possible to eliminate the red image not having the value of the allowable color, for example, the red image low in image quality projected by the projector in which a failure occurs in the image processing, from the images for determining the target value of the color.

B4: Fourth Modified Example

In the first modified example, it is possible for the instruction section 248 to identify a nonselected image different from the selected image out of the first red image F11 and the third red image F33. In this case, it is desirable for the instruction section 248 to make the projector for projecting the nonselected image project an image for calling attention to the user. The image calling attention to the user is an image representing characters such as "please replace." The image calling attention to the user is not limited to the image representing the characters of "please replace." For example, the image calling attention to the user can be an image representing characters of "please repair," or a still image representing a replacement work.

Further, in the third modified example, it is possible for the instruction section 248 to identify the nonselected image different from the selected image out of the first red image F11, the second red image F22, the third red image F33, and the fourth red image F44. In this case, it is desirable for the instruction section 248 to make the projector for projecting the nonselected image project an image for calling attention to the user.

According to this aspect, it becomes possible to inform the user of the projector in which the failure occurs.

B5: Fifth Modified Example

In the first embodiment, when each of the first specific projector 1A and the third specific projector 1C projects the image based on the image signal in the circumstance in which the user-set correction data to be set by the user has not been set, it is possible for each of the first specific projector 1A and the third specific projector 1C to correct the image signal based on the initial correction data set in advance to thereby generate the first correction image signal, and then project the image having the value of the color represented by the first correction image signal. Here, the initial correction data is the data set before shipment in order to correct the difference in color of the projection image caused by the individual difference between the first specific projector 1A and the third specific projector 1C.

Further, when each of the first specific projector 1A and the third specific projector 1C projects the image based on the image signal in the circumstance in which the user-set correction data has been set, it is possible for each of the first specific projector 1A and the third specific projector 1C to correct the image signal based on the initial correction data and the user-set correction data to thereby generate the second correction image signal, and then project the image having the value of the color represented by the second correction image signal.

B6: Sixth Modified Example

In the fifth modified example, it is possible for the color average calculation section 245 to obtain an average of the values of the colors represented by the first correction image signals respectively generated by the first specific projector 1A and the third specific projector 1C. It is possible for the color estimation section 244 to make the first specific projector 1A and the third specific projector 1C project the image based on the red image signal, and estimate the values of the colors of the plurality of display images displayed on the display surface 3. It is possible for the color control section 247 to identify the third adjustment target image showing the value of the color different from the average of the value of the color represented by the first correction image signal out of the plurality of display images, and then control the projector for projecting the third adjustment target image to thereby approximate the value of the color of the third adjustment target image to the average of the value of the color represented by the first correction image signal.

It is possible for the color average calculation section 245 to previously collect the first correction image signal generated by each of the first specific projector 1A and the third specific projector 1C, or to collect the initial correction data from each of the first specific projector 1A and the third specific projector 1C.

When collecting the initial correction data, the color average calculation section 245 corrects the red image signal based on the initial correction data to thereby generate the first correction image signal for each of the first specific projector 1A and the third specific projector 1C. Subsequently, the color average calculation section 245 calculates an average of the colors represented by the first correction image signals of the first specific projector 1A and the third specific projector 1C.

The color average calculation section 245 collects the initial correction data in, for example, the following manner.

The color average calculation section 245 transmits an initial correction data request for requesting the initial correction data from the second communication section 22 to each of the first specific projector 1A and the third specific projector 1C. The color average calculation section 245 receives the initial correction data from each of the first specific projector 1A and the third specific projector 1C via the second communication section 22 as a response to the initial correction data request.

According to this aspect, even when, for example, the color of the image projected by the first specific projector 1A has been changed with the user-set correction data in the preference of a certain user, it is possible to determine the target value of the color without being affected by the change.

It should be noted that in the fifth modified example and the sixth modified example, the first specific projector 1A through the fourth specific projector 1D can be used instead of the first specific projector 1A and the third specific projector 1C.

B7: Seventh Modified Example

In the first embodiment, it is possible for the color control section 247 to identify a projection image of a selected projector as either one of the first specific projector 1A and the third specific projector 1C, and the third adjustment target image different from the projection image of the selected projector out of the first red image F11 and the third red image F33. In this case, the color control section 247 controls the projector for projecting the third adjustment target image to thereby approximate the value of the color of the third adjustment target image to the value of the color of the projection image of the selected projector.

Further, it is possible for the color control section 247 to identify the projection image of the selected projector as any one of the first specific projector 1A through the fourth specific projector 1D, and the third adjustment target image different from the projection image of the selected projector out of the first red image F11 through the fourth red image F44. Also in this case, the color control section 247 controls the projector for projecting the third adjustment target image to thereby approximate the value of the color of the third adjustment target image to the value of the color of the projection image of the selected projector.

According to this aspect, the process of calculating the average can be made unnecessary. Therefore, it is possible to eliminate the color average calculation section 245.

B8: Eighth Modified Example

In the fifth modified example, it is possible for the color control section 247 to identify the third adjustment target image showing a value of a color different from the value of the color represented by the first correction image signal generated by the selected projector as either one of the first specific projector 1A and the third specific projector 1C out of the first red image F11 and the third red image F33. The color control section 247 controls the projector for projecting the third adjustment target image to thereby approximate the value of the color of the third adjustment target image to the value of the color represented by the first correction image signal generated by the selected projector.

According to this aspect, even when, for example, the color of the image projected by a projector different from the selected projector has been changed in the preference of a certain user, it is possible to determine the target value of the color without being affected by the change. Further, the process of calculating the average can be made unnecessary. Therefore, it is possible to eliminate the color average calculation section 245.

It should be noted that in the fifth modified example and the eighth modified example, the first specific projector 1A through the fourth specific projector 1D can be used instead of the first specific projector 1A and the third specific projector 1C.

B9: Ninth Modified Example

In the first embodiment and the first through eighth modified examples, it is desirable for the brightness estimation section 241 to make the second specific projector 1B and the fourth specific projector 1D project the black image in the period of estimating the brightness of each of the first white image F1W and the third white image F3W.

According to this aspect, since it is possible to keep the power supply to the second specific projector 1B and the fourth specific projector 1D, it is possible to speed up the operation of the second specific projector 1B and the fourth specific projector 1D compared to the configuration of stopping the power supply to the second specific projector 1B and the fourth specific projector 1D in the period of estimating the brightness of each of the first white image F1W and the third white image F3W, and then executing the power supply.

B10: Tenth Modified Example

In the seventh modified example or the eighth modified example, it is possible for the color control section 247 to automatically determine the selected projector. For example, the color control section 247 automatically determines the selected projector at random.

According to this aspect, since the selected projector is automatically determined, it is possible to save the user's trouble of designating the selected projector.

B11: Eleventh Modified Example

In the seventh modified example, the eighth modified example, or the tenth modified example, the shift amount of the projection lens in the selected projector can be smaller than the shift amount of the projection lens in the projectors other than the selected projector out of the first specific projector 1A through the fourth specific projector 1D.

For example, in the tenth modified example, the color control section 247 obtains shift amount information representing the shift amount of the projection lens from each of the first specific projector 1A through the fourth specific projector 1D after the completion of the estimation process of the value of the color by the color estimation section 244.

The color control section 247 identifies the selected projector using the shift amount information obtained from each of the first specific projector 1A through the fourth specific projector 1D. The smaller the shift amount of the projection lens is, the higher the possibility that the projector is located at the front of the display surface 3 is. Therefore, according to this aspect, it becomes possible to use the projector high in possibility of being located at the front of the display surface 3 as the selected projector.

B12: Twelfth Modified Example

After the execution of the process of approximating the brightness of the first adjustment target image to the brightness of the first dark image, and approximating the brightness of the second adjustment target image to the brightness of the second dark image, no unevenness in brightness occur ideally in the superimposed image formed by superimposing the first composite image E1 on the second composite image E2 as in the image indicated by E1+E2 in FIG. 11.

However, there is a possibility that an unevenness in brightness occur in the superimposed image due to an estimation error in the brightness estimation section 241 and so on. In the twelfth modified example, the projection system 2000 further includes a plurality of third projectors in order to make the unevenness in brightness in the superimposed image inconspicuous.

Figure 15:
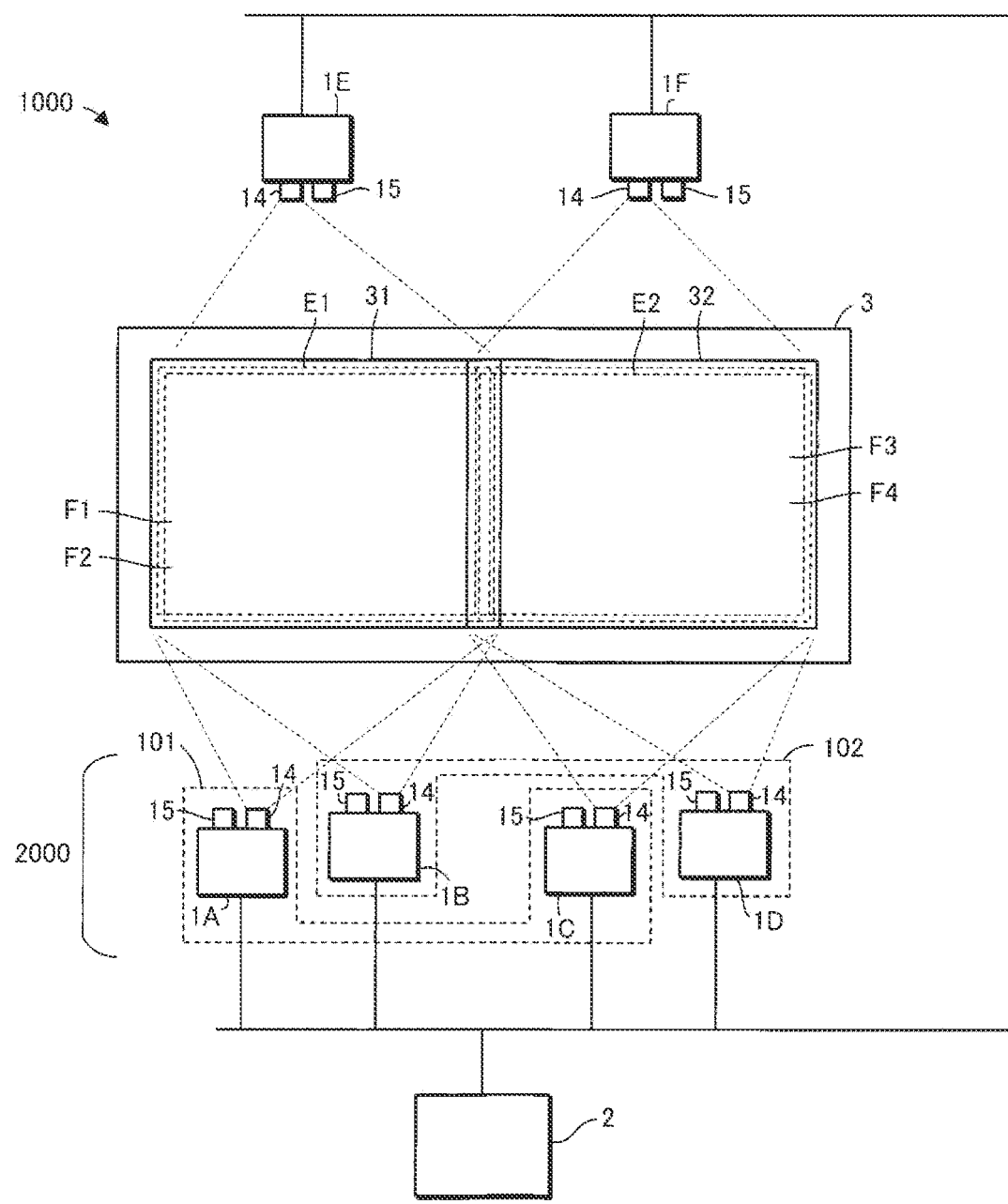
FIG. 15 is a diagram showing a projection system further including a fifth specific projector and a sixth specific projector.

FIG. 15 is a diagram showing the projection system 2000 further including a fifth specific projector 1E and a sixth specific projector 1F. The fifth specific projector 1E and the sixth specific projector 1F are an example of the plurality of third projectors. The fifth specific projector 1E is an example of one of the third projectors.

The fifth specific projector 1E and the sixth specific projector 1F each have the same configuration as each of the first specific projector 1A through the fourth specific projector 1D. The fifth specific projector 1E corresponds to the first area 31. The sixth specific projector 1F corresponds to the second area 32. The fifth specific projector 1E projects an image in the first area 31. The content of the image to be projected by the fifth specific projector 1E is the same as the content of the first projection image F1 and the content of the second projection image F2. The sixth specific projector 1F projects an image in the second area 32. The content of the image to be projected by the sixth specific projector 1F is the same as the content of the third projection image F3 and the content of the fourth projection image F4.

After the execution of the process of approximating the brightness of the first adjustment target image to the brightness of the first dark image, and approximating the brightness of the second adjustment target image to the brightness of the second dark image, the brightness estimation section 241 transmits the instruction of projecting the white image to each of the first specific projector 1A through the sixth specific projector 1F.

After transmitting the instruction of projecting the white image to each of the first specific projector 1A through the sixth specific projector 1F, the brightness estimation section 241 transmits an imaging instruction to the first specific projector 1A and the third specific projector 1C.

In the first specific projector 1A and the third specific projector 1C, in accordance with the imaging instruction, the camera 15 takes an image of the display surface 3 to thereby generate the imaging data. The operation control section 171 transmits the imaging data from the first communication section 13 to the control device 2.

The brightness estimation section 241 estimates the brightness of the first area 31 based on the imaging data received from the first specific projector 1A. The brightness estimation section 241 estimates the brightness of the second area 32 based on the imaging data received from the third specific projector 1C. The brightness estimation section 241 calculates the difference between the brightness of the first area 31 and the brightness of the second area 32. The brightness estimation section 241 estimates the difference as the unevenness in brightness in the area constituted by the first area 31 and the second area 32.

The color control section 247 controls at least one of the fifth specific projector 1E and the sixth specific projector 1F based on the estimation result of the unevenness in brightness to thereby make the unevenness in brightness in the area constituted by the first area 31 and the second area 32 smaller than the unevenness in brightness in that area before performing the control of at least one of the fifth specific projector 1E and the sixth specific projector 1F.

For example, when the first area 31 is brighter than the second area 32, the brightness control section 243 transmits first correction data of decreasing the brightness of the projection image of the fifth specific projector 1E as much as the difference between the brightness of the first area 31 and the brightness of the second area 32 from the second communication section 22 to the fifth specific projector 1E. The fifth specific projector 1E decreases the brightness of the projection image as much as the difference between the brightness of the first area 31 and the brightness of the second area 32 based on the first correction data.

When the second area 32 is brighter than the first area 31, the brightness control section 243 transmits second correction data of decreasing the brightness of the projection image of the sixth specific projector 1F as much as the difference between the brightness of the first area 31 and the brightness of the second area 32 from the second communication section 22 to the sixth specific projector 1F. The sixth specific projector 1F decreases the brightness of the projection image as much as the difference between the brightness of the first area 31 and the brightness of the second area 32 based on the second correction data.

According to this aspect, the difference between the brightness of the first area 31 and the brightness of the second area 32 can be made inconspicuous.

B13: Thirteenth Modified Example

Although the liquid crystal light valves 145 are used as an example of the light modulation device in the projector 1 in the first embodiment and the first through twelfth modified examples, the light modulation device is not limited to the liquid crystal light valves, and can arbitrarily be changed. For example, it is also possible for the light modulation device to have a configuration using three reflective liquid crystal panels. Further, it is also possible for the light modulation device to have a configuration such as a system using a single liquid crystal panel, a system using three digital mirror devices (DMD), or a system using a single digital mirror device. When using just one liquid crystal panel or DMD as the light modulation device, the members corresponding to the color separation optical system and the color combining optical system are unnecessary. Further, besides the liquid crystal panel or the DMD, any configurations capable of modulating the light emitted by the light source 144 can be adopted as the light modulation device.

B14: Fourteenth Modified Example

In the first embodiment and the first through thirteenth modified examples, it is possible to perform imaging of all of the images by a single camera 15. In this case, the single camera 15 can be installed in any one of the first specific projector 1A through the fourth specific projector 1D, or is not required to be installed in any of the projectors.

B15: Fifteenth Modified Example

In the first embodiment and the first through fourteenth modified examples, it is possible for the instruction section 248 to transmit the pattern image data instead of the pattern projection instruction. In this case, the operation control section 171 in the projector 1 outputs the pattern image data transmitted from the instruction section 248 to the image processing section 141.

In the first embodiment and the first through eleventh modified examples, it is possible for the brightness estimation section 241 to transmit the white image data instead of the instruction of projecting the white image. In this case, the operation control section 171 in the projector 1 outputs the white image data transmitted from the brightness estimation section 241 to the image processing section 141.

In the first embodiment and the first through eleventh modified examples, it is possible for the color estimation section 244 to transmit the red image data instead of the instruction of projecting the red image. In this case, the operation control section 171 in the projector 1 outputs the red image data transmitted from the color estimation section 244 to the image processing section 141.

In the first embodiment and the first through eleventh modified examples, it is possible for the brightness estimation section 241 to transmit the black image data instead of the instruction of projecting the black image. In this case, the operation control section 171 in the projector 1 outputs the black image data transmitted from the brightness estimation section 241 to the image processing section 141.

What is claimed is:

1. A method of controlling a display system including a plurality of first projectors, a plurality of second projectors, and a control device, the method comprising:
    projecting, by one of the first projectors, an image in one display area corresponding to the one of the first projectors out of a plurality of display areas, and projecting, by one of the second projectors corresponding to the one display area, an image in the one display area to thereby display one of images corresponding one-to-one to the plurality of first projectors and one of images corresponding one-to-one to the plurality of second projectors in the one display area;
    making, by the control device, each of the first projectors project a first image to estimate brightness of each of the first images, and making each of the second projectors project a second image to estimate brightness of each of the second images;
    identifying, by the control device, a first dark image as a darkest image and a first adjustment target image different from the first dark image out of the plurality of first images based on a result of the estimation of the brightness of each of the first images, and identifying a second dark image as a darkest image and a second adjustment target image different from the second dark image out of the plurality of second images based on a result of the estimation of the brightness of each of the second images; and
    controlling, by the control device, a projector configured to project the first adjustment target image to thereby approximate the brightness of the first adjustment target image to the brightness of the first dark image, and controlling a projector configured to project the second adjustment target image to thereby approximate the brightness of the second adjustment target image to the brightness of the second dark image.

2. The method of controlling the display system according to claim 1, wherein
    the control device
        makes the plurality of first projectors project a third image having a solid color to estimate values of colors of the plurality of third images displayed on a display surface including the plurality of display areas,
        obtains an average of the values of the colors of the plurality of third images based on a result of the estimation of the values of the colors, and
        identifies a third adjustment target image showing a value of a color different from the average out of the plurality of third images, and controls the projector configured to project the third adjustment target image to thereby approximate the value of the color of the third adjustment target image to the average.

3. The method of controlling the display system according to claim 1, wherein
    the control device
        makes the plurality of first projectors project a third image having a solid color to estimate values of colors of the plurality of third images displayed on a display surface including the plurality of display areas,
        identifies the third image having a value of an allowable color out of the plurality of third images as a selected image based on a result of the estimation of the values of the colors,
        obtains an average of the value of the color of the selected image, and
        identifies a third adjustment target image showing a value of a color different from the average out of the plurality of third images, and controls the projector configured to project the third adjustment target image to thereby approximate the value of the color of the third adjustment target image to the average.

4. The method of controlling the display system according to claim 1, wherein
    the control device
        makes the plurality of first projectors and the plurality of second projectors project a third image having a solid color to estimate values of colors of the plurality of third images displayed on a display surface including the plurality of display areas,
        obtains an average of the values of the colors of the plurality of third images based on a result of the estimation of the values of the colors, and
        identifies a third adjustment target image showing a value of a color different from the average out of the plurality of third images, and controls the projector configured to project the third adjustment target image to thereby approximate the value of the color of the third adjustment target image to the average.

5. The method of controlling the display system according to claim 1, wherein
    the control device
        makes the plurality of first projectors and the plurality of second projectors project a third image having a solid color to estimate values of colors of the plurality of third images displayed on a display surface including the plurality of display areas,
        selects a selected image having a value of an allowable color out of the plurality of third images based on a result of the estimation of the values of the colors,
        obtains an average of the value of the color of the selected image, and
        identifies a third adjustment target image showing a value of a color different from the average out of the plurality of third images, and controls the projector configured to project the third adjustment target image to thereby approximate the value of the color of the third adjustment target image to the average.

6. The method of controlling the display system according to claim 3, wherein
    the control device
        identifies a nonselected image different from the selected image out of the plurality of third images, and
        makes the projector configured to project the nonselected image project an image configured to call attention to a user.

7. The method of controlling the display system according to claim 1, wherein
    each of the first projectors
        corrects an image signal representing a third image having a solid color based on initial correction data set in advance to thereby generate a first correction image signal, and then projects an image having a value of a color represented by the first correction image signal when projecting an image based on the image signal in a circumstance in which user-set correction data to be set by a user is not set, and corrects the image signal based on the initial correction data and the user-set correction data to thereby generate a second correction image signal, and then projects an image having a value of a color represented by the second correction image signal when projecting an image based on the image signal in a circumstance in which the user-set correction data is set, and the control device obtains an average of values of colors represented by the first correction image signals respectively generated by the first projectors, makes the plurality of first projectors project an image based on the image signal to estimate values of colors of the plurality of display images displayed on a display surface including the plurality of display areas, identifies a third adjustment target image showing a value of a color different from the average out of the plurality of display images, and controls the projector configured to project the third adjustment target image to thereby approximate the value of the color of the third adjustment target image to the average.

8. The method of controlling the display system according to claim 1, wherein each of the first projectors and each of the second projectors corrects an image signal representing a third image having a solid color based on initial correction data set in advance to thereby generate a first correction image signal, and then projects an image having a value of a color represented by the first correction image signal when projecting an image based on the image signal in a circumstance in which user-set correction data to be set by a user is not set, and corrects the image signal based on the initial correction data and the user-set correction data to thereby generate a second correction image signal, and then projects an image having a value of a color represented by the second correction image signal when projecting an image based on the image signal in a circumstance in which the user-set correction data is set, and the control device obtains an average of values of colors represented by the correction image signals respectively generated by the first projectors and the second projectors, makes the plurality of first projectors and the plurality of second projectors project an image based on the image signal to estimate values of colors of the plurality of display images displayed on a display surface including the plurality of display areas, and identifies a third adjustment target image showing a value of a color different from the average out of the plurality of display images, and controls the projector configured to project the third adjustment target image to thereby approximate the value of the color of the third adjustment target image to the average.

9. The method of controlling the display system according to claim 1, wherein the control device makes the plurality of first projectors project a third image having a solid color to estimate values of colors of the plurality of third images displayed on a display surface including the plurality of display areas, identifies a projection image of a selected projector as either one of the first projectors and a third adjustment target image different from the projection image out of the plurality of third images, and controls the projector configured to project the third adjustment target image to thereby approximate the value of the color of the third adjustment target image to a value of a color of the projection image.

10. The method of controlling the display system according to claim 1, wherein the control device makes the plurality of first projectors and the plurality of second projectors project a third image having a solid color to estimate values of colors of the plurality of third images displayed on a display surface including the plurality of display areas, identifies a projection image of a selected projector included in either one of the plurality of first projectors and the plurality of second projectors and a third adjustment target image different from the projection image out of the plurality of third images, and controls the projector configured to project the third adjustment target image to thereby approximate the value of the color of the third adjustment target image to a value of a color of the projection image.

11. The method of controlling the display system according to claim 1, wherein each of the first projectors corrects an image signal representing a third image having a solid color based on initial correction data set in advance to thereby generate a first correction image signal, and then projects an image having a value of a color represented by the first correction image signal when projecting an image based on the image signal in a circumstance in which user-set correction data to be set by a user is not set, and corrects the image signal based on the initial correction data and the user-set correction data to thereby generate a second correction image signal, and then projects an image having a value of a color represented by the second correction image signal when projecting an image based on the image signal in a circumstance in which the user-set correction data is set, and the control device makes the plurality of first projectors project an image based on the image signal to estimate values of colors of the plurality of display images displayed on a display surface including the plurality of display areas, and identifies a third adjustment target image showing a value of a color different from a value of a color represented by the first correction image signal generated by a selected projector as either one of the first projectors out of the plurality of display images, and then controls the projector configured to project the third adjustment target image to thereby approximate the value of the color of the third adjustment target image to the value of the color represented by the first correction image signal generated by the selected projector.

12. The method of controlling the display system according to claim 1, wherein
each of the first projectors and each of the second projectors
corrects an image signal representing a third image having a solid color based on initial correction data set in advance to thereby generate a first correction image signal, and then projects an image having a value of a color represented by the first correction image signal when projecting an image based on the image signal in a circumstance in which user-set correction data to be set by a user is not set, and
corrects the image signal based on the initial correction data and the user-set correction data to thereby generate a second correction image signal, and then projects an image having a value of a color represented by the second correction image signal when projecting an image based on the image signal in a circumstance in which the user-set correction data is set, and
the control device
makes the plurality of first projectors and the plurality of second projectors project an image based on the image signal to estimate values of colors of the plurality of display images displayed on a display surface including the plurality of display areas, and
identifies a third adjustment target image showing a value of a color different from a value of a color represented by the first correction image signal generated by a selected projector included in either one of the plurality of first projectors and the plurality of second projectors out of the plurality of display images, and then controls the projector configured to project the third adjustment target image to thereby approximate the value of the color of the third adjustment target image to the value of the color represented by the first correction image signal generated by the selected projector.

13. The method of controlling the display system according to claim 1, wherein
the control device makes each of the second projectors project a black image in a period of estimating the brightness of each of the first images.

14. The method of controlling the display system according to claim 1, wherein
the display system further includes a plurality of third projectors,
one of the third projectors projects an image in one display area corresponding to the one of the third projectors out of the plurality of display areas, and
the control device
estimates an unevenness in brightness in an area constituted by the plurality of display areas after execution of a process of approximating the brightness of the first adjustment target image to the brightness of the first dark image, and approximating the brightness of the second adjustment target image to the brightness of the second dark image, and
controls at least one of the third projectors based on a result of the estimation of the unevenness in brightness to thereby make the unevenness in brightness in the area after the control of the plurality of third projectors smaller than the unevenness in brightness in the area before the control of at least one of the third projectors.

15. A method of controlling a display system including a first specific projector, a second specific projector, a third specific projector, and a fourth specific projector, the method comprising:
projecting, by the first specific projector, a first projection image with first brightness in a first area based on a first image signal;
projecting, by the second specific projector, a second projection image with second brightness in the first area based on the first image signal;
projecting, by the third specific projector, a third projection image with third brightness in a second area based on the first image signal;
projecting, by the fourth specific projector, a fourth projection image with fourth brightness in the second area based on the first image signal;
displaying a first composite image with the first projection image displayed in the first area and the third projection image displayed in the second area;
displaying a second composite image with the second projection image displayed in the first area and the fourth projection image displayed in the second area;
projecting, by the first specific projector, the first projection image with the third brightness when the third brightness is darker than the first brightness;
controlling, by the first specific projector, the third specific projector to thereby project the third projection image with the first brightness when the first brightness is darker than the third brightness;
controlling, by the first specific projector, the second specific projector to thereby project the second projection image with the fourth brightness when the fourth brightness is darker than the second brightness;
controlling, by the first specific projector, the fourth specific projector to thereby project the fourth projection image with the second brightness when the second brightness is darker than the fourth brightness; and
projecting, by the first specific projector, the second specific projector, the third specific projector, and the fourth specific projector, a superimposed image which is obtained by superimposing the first composite image and the second composite image, and is brighter than the first brightness, the second brightness, the third brightness, and the fourth brightness.

16. The method of controlling the display system according to claim 15, wherein
a part of the first area overlaps a part of the second area.

17. A control device configured to control a display system which includes a plurality of first projectors and a plurality of second projectors, and in which one of the first projectors projects an image in one display area corresponding to the one of the first projectors out of a plurality of display areas, and one of the second projectors corresponding to the one display area projects an image in the one display area to thereby display one of images corresponding one-to-one to the plurality of first projectors and one of images corresponding one-to-one to the plurality of second projectors in the one display area, the control device comprising:
an estimation section configured to make each of the first projectors project a first image to estimate brightness of each of the first images, and make each of the second projectors project a second image to estimate brightness of each of the second images;
an identification section configured to identify a first dark image as a darkest image and a first adjustment target image different from the first dark image out of the plurality of first images based on a result of the estimation of the brightness of each of the first images, and identify a second dark image as a darkest image and a second adjustment target image different from the second dark image out of the plurality of second images based on a result of the estimation of the brightness of each of the second images; and a brightness control section configured to control a projector configured to project the first adjustment target image to thereby approximate the brightness of the first adjustment target image to the brightness of the first dark image, and control a projector configured to project the second adjustment target image to thereby approximate the brightness of the second adjustment target image to the brightness of the second dark image.

* * * * *